(12) United States Patent
Brons

(10) Patent No.: US 9,416,325 B2
(45) Date of Patent: Aug. 16, 2016

(54) METHODS AND SYSTEMS FOR PREDICTING A NEED FOR INTRODUCING ANTI-FOULING ADDITIVES TO A HYDROCARBON STREAM TO REDUCE FOULING OF CRUDE HYDROCARBON REFINERY COMPONENTS

(71) Applicant: Glen B. Brons, Phillipsburg, NJ (US)

(72) Inventor: Glen B. Brons, Phillipsburg, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 386 days.

(21) Appl. No.: 14/132,103

(22) Filed: Dec. 18, 2013

(65) Prior Publication Data

US 2014/0275663 A1 Sep. 18, 2014

Related U.S. Application Data

(63) Continuation-in-part of application No. 13/804,727, filed on Mar. 14, 2013, now abandoned.

(51) Int. Cl.
  *C10G 75/04* (2006.01)
  *G01F 3/00* (2006.01)
  *C08F 8/32* (2006.01)
  (Continued)

(52) U.S. Cl.
  CPC . *C10G 75/04* (2013.01); *C08F 8/32* (2013.01); *C10L 1/2364* (2013.01); *C10L 1/2383* (2013.01); *C10L 10/04* (2013.01); *G01F 3/00* (2013.01); *C10L 2290/141* (2013.01); *C10L 2290/58* (2013.01); *C10L 2290/60* (2013.01)

(58) Field of Classification Search
  CPC ....................................................... C10G 75/04
  See application file for complete search history.

(56) References Cited

U.S. PATENT DOCUMENTS

| 4,368,133 A | 1/1983 | Forsberg |
| 5,777,041 A | 7/1998 | Emert et al. |

(Continued)

FOREIGN PATENT DOCUMENTS

WO 2011014215 A1 2/2011

OTHER PUBLICATIONS

Kropp et al., "Surface-Mediated Reations. 1. Hydrohalogenation of Alkenes and Alkynes", Journal of the American Chemical Society, vol. 112, pp. 7433-7434 (1990).

(Continued)

*Primary Examiner* — Brian McCaig
(74) *Attorney, Agent, or Firm* — Glenn T. Barrett; Andrew T. Ward

(57) ABSTRACT

Method and system for predicting a need for introducing anti-fouling additives to a hydrocarbon stream in a hydrocarbon refinery. The method comprises characterizing whether the hydrocarbon stream is a non-high solvency dispersive power ("HSDP") crude and performing at least one of determining whether the hydrocarbon stream is subject to filterable solids levels greater than about 100 wppm or classifying whether the hydrocarbon stream has an expected low flow velocity during normal operating conditions within the refinery. The method further comprises indicating, using a processor, that anti-fouling additives are recommended if the hydrocarbon stream is characterized to be a non-HSDP crude and either the hydrocarbon stream is determined to be subject to filterable solids levels greater than about 100 wppm or the hydrocarbon stream is classified as having expected low flow within a heat exchanger of the refinery.

13 Claims, 14 Drawing Sheets

(51) Int. Cl.
*C10L 1/236* (2006.01)
*C10L 1/2383* (2006.01)
*C10L 10/04* (2006.01)

(56) References Cited

U.S. PATENT DOCUMENTS

| | | | |
|---|---|---|---|
| 5,871,634 | A | 2/1999 | Wiehe et al. |
| 6,331,656 | B1 | 12/2001 | Blankertz et al. |
| 7,833,407 | B2 | 11/2010 | Brons et al. |
| 7,837,855 | B2 | 11/2010 | Brons et al. |
| 7,901,564 | B2 | 3/2011 | Brons et al. |
| 7,919,058 | B2 | 4/2011 | Brons et al. |
| 7,951,349 | B2 | 5/2011 | Kindler et al. |
| 8,062,504 | B2 | 11/2011 | Wright et al. |
| 8,063,232 | B2 | 11/2011 | Hagadorn et al. |
| 8,283,419 | B2 | 10/2012 | Hagadorn et al. |
| 8,372,930 | B2 | 2/2013 | Brant et al. |
| 8,399,725 | B2 | 3/2013 | Brant et al. |
| 8,425,761 | B2 | 4/2013 | Wright et al. |
| 8,440,069 | B2 | 5/2013 | Wright et al. |
| 2009/0032435 | A1* | 2/2009 | Brons ............ C10G 9/16 208/14 |
| 2009/0318644 | A1 | 12/2009 | Brant et al. |
| 2009/0318646 | A1 | 12/2009 | Brant et al. |
| 2010/0038290 | A1 | 2/2010 | Wang et al. |
| 2010/0170829 | A1 | 7/2010 | Ng et al. |
| 2011/0147275 | A1 | 6/2011 | Ng et al. |
| 2011/0265558 | A1 | 11/2011 | Feimer et al. |
| 2012/0245298 | A1 | 9/2012 | Hagadorn et al. |
| 2012/0245310 | A1 | 9/2012 | Crowther et al. |
| 2012/0245311 | A1 | 9/2012 | Crowther et al. |
| 2012/0245312 | A1 | 9/2012 | Holtcamp et al. |
| 2012/0245313 | A1 | 9/2012 | Crowther et al. |
| 2012/0309998 | A1 | 12/2012 | Holtcamp et al. |
| 2013/0245299 | A1 | 9/2013 | Geboers et al. |

OTHER PUBLICATIONS

Resconi et al., "Olefin Polymerization at bis(Pentamethylcyclopentadienyl)Zircornium and -Hafnium Centers: Chain-Transfer Mechanisms", Journal of the American Chemical Society, vol. 114, pp. 1025-1032, (1992).

* cited by examiner

METHODS AND SYSTEMS FOR PREDICTING A NEED FOR INTRODUCING ANTI-FOULING ADDITIVES TO A HYDROCARBON STREAM TO REDUCE FOULING OF CRUDE HYDROCARBON REFINERY COMPONENTS

CROSS REFERENCE TO RELATED APPLICATIONS

The present application is a continuation-in-part application of U.S. Utility application Ser. No. 13/804,727, entitled "Functionalized Polymers Containing Polyamine Succinimide For Antifouling in Hydrocarbon Refining Processes", filed on Mar. 14, 2013, the disclosure of which is incorporated by reference herein in its entirety.

TECHNICAL FIELD

The disclosed subject matter relates to additives to reduce fouling of crude hydrocarbon refinery components, and methods and systems using the same. In another aspect, the disclosed subject matter relates to methods of identifying refineries with a need for anti-fouling additives and calibrating anti-fouling additive use with refinery operating parameters.

BACKGROUND

Crude Pre-Heat Train exchangers are used to heat the crude oil as part of the distillation process. The crude is run on one side of tube-and-shell exchangers and heated by the hot streams run on the opposite side. More typically, crude oil is run through the tube side of the exchangers, however, some refineries run crude through the shell side with the hot stream on the tube side. The crude oil is run through a series of exchangers leading to the desalter and then to the atmospheric furnace. Whole crude oil fouling within exchangers is costly to the petroleum industry due to reduced throughput, energy losses due to needed increased furnace firing and higher cleaning and maintenance costs. In some cases, unplanned unit shut-downs occur due to fouling which adds to the high costs of fouling. To mitigate fouling addition of additives known as anti-foulant additives to crude oil before heat exchanger is a common practice.

Multi-purpose additives can reduce cost in the refining operation. Petroleum refineries incur additional energy costs, perhaps billions per year, due to fouling and the resulting attendant inefficiencies caused by the fouling. More particularly, thermal processing of crude oils, blends and fractions in heat transfer equipment, such as heat exchangers, is hampered by the deposition of insoluble asphaltenes and other contaminants (i.e., particulates, salts, etc.) that may be found in crude oils. Further, the asphaltenes and other organics are known to thermally degrade to coke when exposed to high heater tube surface temperatures.

Fouling in heat exchangers receiving petroleum-type process streams can result from a number of mechanisms including chemical reactions, corrosion, deposit of existing insoluble impurities in the stream, and deposit of materials rendered insoluble by the temperature difference ($\Delta T$) between the process stream and the heat exchanger wall. For example, naturally-occurring asphaltenes can precipitate from the crude oil process stream, thermally degrade to form a coke and adhere to the hot surfaces. Further, the high $\Delta T$ found in heat transfer operations result in high surface or skin temperatures when the process stream is introduced to the heater tube surfaces, which contributes to the precipitation of insoluble particulates. Another common cause of fouling is attributable to the presence of salts, particulates and impurities (e.g., inorganic contaminants) found in the crude oil stream. For example, iron oxide/sulfide, calcium carbonate, silica, sodium chloride and calcium chloride have all been found to attach directly to the surface of a fouled heater rod and throughout the coke deposit. These solids promote and/or enable additional fouling of crude oils.

The buildup of insoluble deposits in heat transfer equipment creates an unwanted insulating effect and reduces the heat transfer efficiency. Fouling also reduces the cross-sectional area of process equipment, which decreases flow rates and desired pressure differentials to provide less than optimal operation. To overcome these disadvantages, heat transfer equipment is ordinarily taken offline and cleaned mechanically or chemically cleaned, resulting in lost production time.

There is a need to reduce precipitation/adherence of particulates and asphaltenes from the heated surface to prevent fouling, particularly before the asphaltenes are thermally degraded or coked. Such reduction will improve the performance of the heat transfer equipment, decrease or eliminate scheduled outages for fouling mitigation efforts, and reduce energy costs associated with the processing activity.

Antifoulant additives have been described in a number of commonly-owned applications, including U.S. Patent Application Publication Nos. 20110147275 and 20100170829, the disclosure of each of which is incorporated herein by reference in its entirety. However, there remains a need for alternative antifoulant additives capable of reducing precipitation and/or adherence of particulates and asphaltenes.

Antifoulant additives are associated with significant cost and other drawbacks, such that their indiscriminate use is advantageously avoided. Accordingly, a further need exists for methods of predicting a need for antifoulant additives according to the operating parameters of a refinery.

SUMMARY

As disclosed herein, a method is provided for predicting a need for introducing anti-fouling additives to a hydrocarbon stream in a hydrocarbon refinery, the method comprising characterizing whether the hydrocarbon stream is high solvency dispersive power ("HSDP") crude or non-HSDP crude, performing at least one of (a) determining whether the hydrocarbon stream is subject to filterable solids levels greater than about 100 wppm, or (b) classifying whether the hydrocarbon stream has an expected low flow velocity during normal operating conditions within the refinery, and indicating, using a processor, that anti-fouling additives are recommended if the hydrocarbon stream is characterized to be a non-HSDP crude and either the hydrocarbon stream is determined to be subject to filterable solids levels greater than about 100 wppm or the hydrocarbon stream is classified as having expected low flow within the refinery.

In further embodiments according to the disclosed subject matter, the method further comprises comprising introducing one or more antifouling additives to the hydrocarbon stream where the processor indicates that anti-fouling additives are recommended.

As further disclosed herein, a system is provided for predicting a need for introducing anti-fouling additives to a hydrocarbon stream in a hydrocarbon refinery, the system comprising a processor to receive a characterization of whether the hydrocarbon stream is a non-HSDP crude, and at least one of a determination whether the hydrocarbon stream contains filterable solids levels greater than about 100 wppm, or a classification whether the hydrocarbon stream has an expected low flow velocity within the refinery during normal operating conditions, the processor configured to indicate that anti-fouling additives are recommended if the characterization is that the hydrocarbon stream is a non-HSDP crude and either the determination is that the hydrocarbon stream is subject to filterable solids levels greater than about 100 wppm or the classification is the hydrocarbon stream has an expected low flow within the refinery.

In accordance with another aspect of the disclosed subject matter, multipurpose chemical additives (MPC) are provided to mitigate fouling in hydrocarbon refinery processes, such as in a heat exchanger. Likewise, and in accordance with another aspect of the disclosed subject matter, a method for reducing fouling a hydrocarbon is provided. Such method can be used in combination with the predicting method and system above. The method includes (i) providing a crude hydrocarbon for a refining process; and (ii) adding an additive to the crude hydrocarbon, the additive being represented by one of Formula A and Formula B below:

(Formula A)

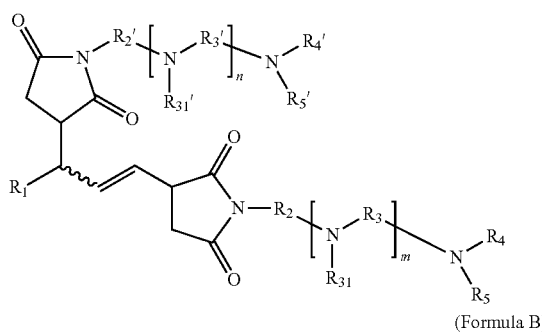

(Formula B)

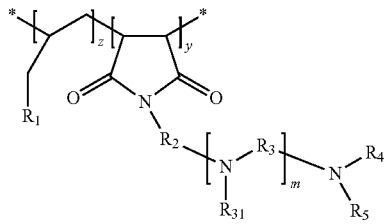

wherein in each of Formula A and Formula B above:
m is an integer between 0 and 10 inclusive;
$R_1$ is a branched or straight-chained $C_{10}$-$C_{800}$ alkyl or alkenyl group;
$R_2$ is a $C_1$-$C_4$ branched or straight chained alkylene group;
$R_3$ is a $C_1$-$C_4$ branched or straight chained alkylene group;
$R_{31}$ is hydrogen or —$R_8$-$R_9$, wherein $R_8$ is $C_1$-$C_4$ branched or straight chained alkylene group, and $R_9$ is

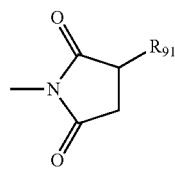

wherein $R_{91}$ is a branched or straight-chained $C_{10}$-$C_{800}$ alkyl or alkenyl group; or $R_8$ and $R_9$ together are a $C_1$-$C_4$ branched or straight chained alkyl group optionally substituted with one or more amine groups; and further wherein the —N($R_{31}$)—$R_3$— repeat unit is optionally interrupted in one or more places by a nitrogen-containing heterocyclic cycloalkyl group; and $R_4$ and $R_5$ are each independently selected from (a) hydrogen; (b) a bond connected to $R_{31}$ in the last distal —N($R_{31}$)—$R_3$— repeat unit; or (c) —$R_6$-$R_7$, wherein $R_6$ is $C_1$-$C_4$ branched or straight chained alkylene group, and $R_7$ is

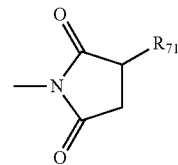

wherein $R_{71}$ is a branched or straight-chained $C_{10}$-$C_{800}$ alkyl or alkenyl group;

wherein in Formula B, n is an integer between 0 and 10 inclusive, and the groups $R_2'$, $R_3'$, $R_{31}'$, $R_4'$ and $R_5'$ are each defined the same as $R_2$, $R_3$, $R_{31}$ and $R_4$, and $R_5$, respectively;

wherein in Formula B, z is 1 or 2, and y is an integer between 1 and 5 inclusive.

According to another aspect of the disclosed subject matter, a compound of Formula A as noted above is provided.

According to another aspect of the disclosed subject matter, a method for preparing a compound for reducing fouling of a crude hydrocarbon in a hydrocarbon refining process is provided. The method includes:

(a) reacting a polymer base unit $R_{11}$, which is a branched or straight-chained $C_{10}$-$C_{800}$ alkyl or alkenyl group having a vinyl terminal group, with maleic anhydride to obtain a polymer represented by Formula I below:

(I)

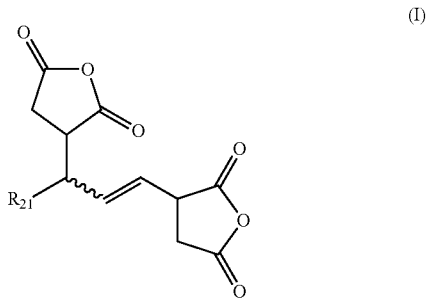

wherein $R_{21}$ is a branched or straight-chained $C_{10}$-$C_{800}$ alkyl or alkenyl group;

(b) reacting the polymer obtained in (a) with a polyamine represented by

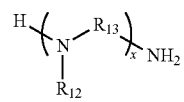

wherein $R_{12}$ is hydrogen or a $C_1$-$C_4$ branched or straight chained alkyl optionally substituted with one or more amine groups, $R_{13}$ is a $C_1$-$C_4$ branched or straight chained alkylene group, and x is an integer between 1 and 10, and further wherein the —N($R_{12}$)—$R_{13}$— unit is optionally interrupted in one or more places by a nitrogen-containing heterocyclic cycloalkyl group, and wherein when the x-th —N(R$_{12}$)—R$_{13}$— unit along with the terminal nitrogen atom forms a heterocyclic cycloalkyl group, the terminal —NH$_2$ is replaced by a —NH— group for valency.

According to a further aspect of the disclosed subject matter, a compound prepared by the above method is provided.

According to another aspect of the disclosed subject matter, a method for reducing fouling in a hydrocarbon refinery process is provided. The method includes: providing a crude hydrocarbon for a refining process; and adding an additive to the crude hydrocarbon, the additive represented by Formula A.

According to another aspect of the disclosed subject matter, a compound of Formula B as noted above is provided.

In a further aspect, a method for preparing a compound of Formula B for reducing fouling of a crude hydrocarbon in a hydrocarbon refining process is provided. The method includes:

(a) reacting a polymer base unit R$_{11}$, which is a branched or straight-chained C$_{10}$-C$_{800}$ alkyl or alkenyl group having a vinyl terminal group, with maleic anhydride to obtain a polymer represented by Formula II below:

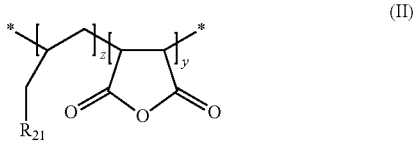

(II)

wherein R$_{21}$ is a branched or straight-chained C$_{10}$-C$_{800}$ alkyl or alkenyl group, z is 1 or 2, and y is an integer between 1 and 5 inclusive;

(b) reacting the polymer obtained in (a) with a polyamine represented by

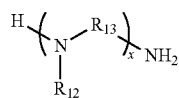

wherein R$_{12}$ is hydrogen or a C$_1$-C$_4$ branched or straight chained alkyl optionally substituted with one or more amine groups, R$_{13}$ is a C$_1$-C$_4$ branched or straight chained alkylene group, and x is an integer between 1 and 10, and further wherein the —N(R$_{12}$)—R$_{13}$— unit is optionally interrupted in one or more places by a nitrogen-containing heterocyclic cycloalkyl group, and wherein when the x-th —N(R$_{12}$)—R$_{13}$— unit along with the terminal nitrogen atom forms a heterocyclic cycloalkyl group, the terminal —NH$_2$ is replaced by a —NH— group for valency.

In a further aspect, a compound prepared by the above method is provided.

In yet a further aspect, a method for reducing fouling in a hydrocarbon refinery process is provided. The method includes: providing a crude hydrocarbon for a refining process; and adding an additive to the crude hydrocarbon, the additive represented by formula B.

In addition, the disclosed subject matter provides compositions comprising such additives, and systems for refining hydrocarbons containing such additives and compositions.

BRIEF DESCRIPTION OF THE DRAWINGS

The disclosed subject matter will now be described in conjunction with the accompanying drawings in which.

DETAILED DESCRIPTION

Definitions

Figure 1:
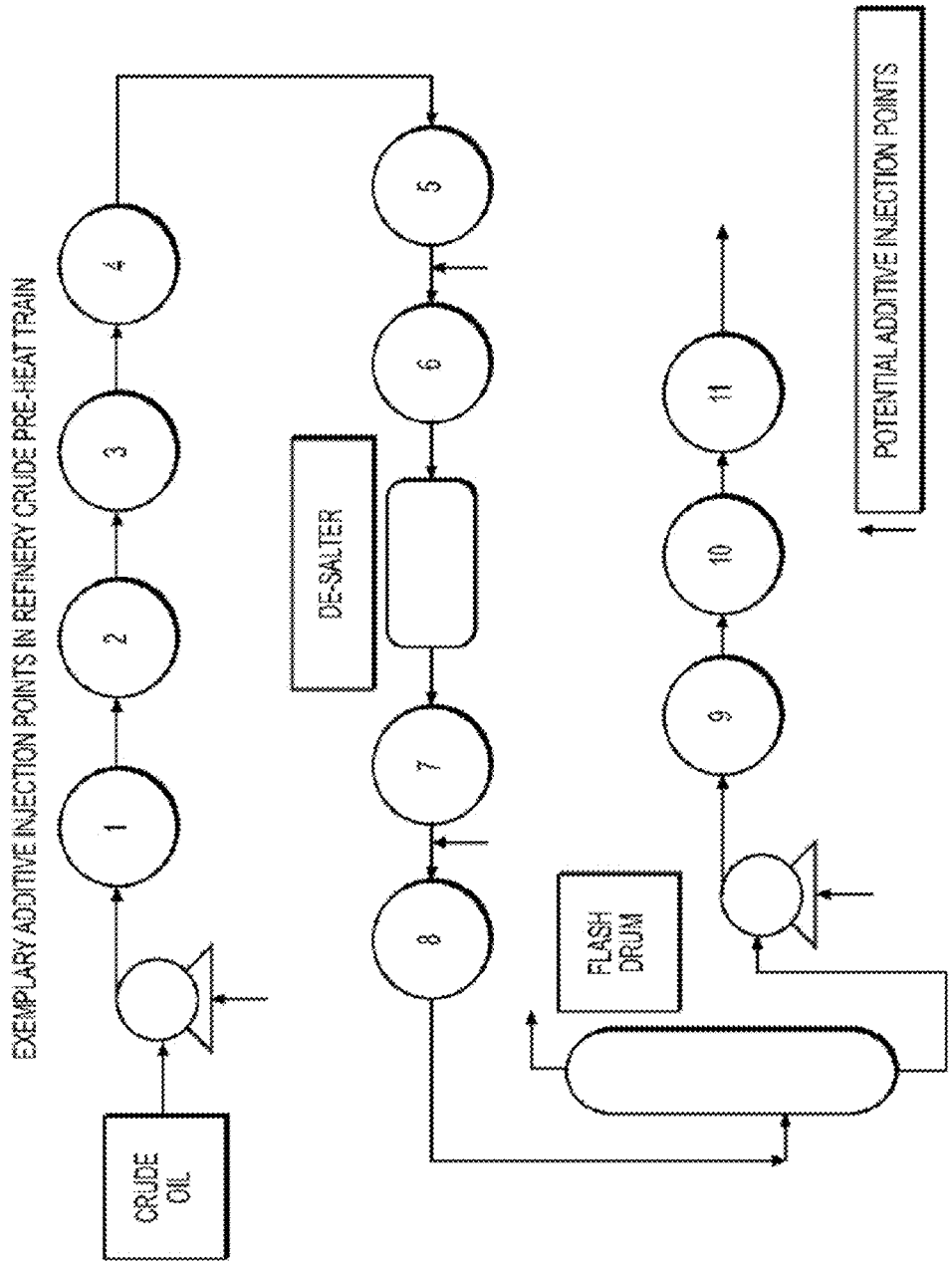
FIG. 1 is a representation of an oil refinery crude pre-heat train, annotated to show non-limiting injection points for the additives of the disclosed subject matter.

The following definitions are provided for purpose of illustration and not limitation.

As used herein, the term "fouling" generally refers to the accumulation of unwanted materials on the surfaces of processing equipment or the like, particularly processing equipment in a hydrocarbon refining process.

As used herein, the term "particulate-induced fouling" generally refers to fouling caused primarily by the presence of variable amounts of organic or inorganic particulates. Organic particulates (such as precipitated asphaltenes and coke particles) include, but are not limited to, insoluble matter precipitated out of solution upon changes in process conditions (e.g., temperature, pressure, or concentration changes) or a change in the composition of the feed stream (e.g., changes due to the occurrence of a chemical reaction). Inorganic particulates include, but are not limited to, silica, iron oxide, iron sulfide, alkaline earth metal oxide, sodium chloride, calcium chloride and other inorganic salts. One major source of these particulates results from incomplete solids removal during desalting and/or other particulate removing processes. Solids promote the fouling of crude oils and blends due to physical effects by modifying the surface area of heat transfer equipment, allowing for longer holdup times at wall temperatures and causing coke formation from asphaltenes and/or crude oil(s).

As used herein, the term "alkyl" refers to a monovalent hydrocarbon group containing no double or triple bonds and arranged in a branched or straight chain.

As used herein, the term "alkylene" refers to a divalent hydrocarbon group containing no double or triple bonds and arranged in a branched or straight chain.

As used herein, the term "alkenyl" refers to a monovalent hydrocarbon group containing one or more double bonds and arranged in a branched or straight chain.

As used herein, a "hydrocarbyl" group refers to any univalent radical that is derived from a hydrocarbon, including univalent alkyl, aryl and cycloalkyl groups.

As used herein, the term "crude hydrocarbon refinery component" generally refers to an apparatus or instrumentality of a process to refine crude hydrocarbons, such as an oil refinery process, which is, or can be, susceptible to fouling. Crude hydrocarbon refinery components include, but are not limited to, heat transfer components such as a heat exchanger, a furnace, a crude preheater, a coker preheater, or any other heaters, a FCC slurry bottom, a debutanizer exchanger/tower, other feed/effluent exchangers and furnace air preheaters in refinery facilities, flare compressor components in refinery facilities and steam cracker/reformer tubes in petrochemical facilities. Crude hydrocarbon refinery components can also include other instrumentalities in which heat transfer can take place, such as a fractionation or distillation column, a scrubber, a reactor, a liquid-jacketed tank, a pipestill, a coker and a visbreaker. It is understood that "crude hydrocarbon refinery components," as used herein, encompasses tubes, piping, baffles and other process transport mechanisms that are internal to, at least partially constitute, and/or are in direct fluid communication with, any one of the above-mentioned crude hydrocarbon refinery components.

As used herein, a reduction (or "reducing") of particulate-induced fouling is generally achieved when the ability of particulates to adhere to heated equipment surfaces is reduced, thereby mitigating their impact on the promotion of the fouling of crude oil(s), blends, and other refinery process streams.

As used herein, reference to a group being a particular polymer (e.g., polypropylene or poly(ethylene-co-propylene) encompasses polymers that contain primarily the respective monomer along with negligible amounts of other substitutions and/or interruptions along polymer chain. In other words, reference to a group being a polypropylene group does not require that the group consist of 100% propylene monomers without any linking groups, substitutions, impurities or other substituents (e.g., alkylene or alkenylene substituents). Such impurities or other substituents can be present in relatively minor amounts so long as they do not affect the industrial performance of the additive, as compared to the same additive containing the respective polymer substituent with 100% purity.

For the purposes of the present application, when a polymer is referred to as comprising an olefin, the olefin present in the polymer is the polymerized form of the olefin.

As used herein, a copolymer is an polymer comprising at least two different monomer units (such as propylene and ethylene). A homo-polymer is an polymer comprising units of the same monomer (such as propylene). A propylene polymer is a polymer having at least 50 mole % of propylene.

The term "vinyl termination", also referred to as "allyl chain end(s)" or "vinyl content" is defined to be a polymer having at least one terminus represented by:

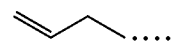

allylic vinyl end group where the "·····" represents the polymer chain.

In a preferred embodiment the allyl chain end is represented by:

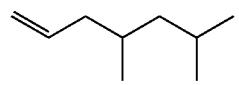

allylic vinyl end group

The amount of allyl chain ends (also called % vinyl termination) is determined using $^1$H NMR at 120° C. using deuterated tetrachloroethane as the solvent on a 500 MHz machine and in selected cases confirmed by $^{13}$C NMR. Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl terminated propylene polymers in J American Chemical Soc 114 1992, 1025-1032, hereby incorporated by reference in its entirety, that are useful herein.

"Isobutyl chain end" is defined to be a polymer having at least one terminus represented by the formula:

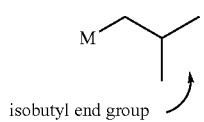

isobutyl end group where M represents the polymer chain. In an example embodiment, the isobutyl chain end is represented by one of the following formulae:

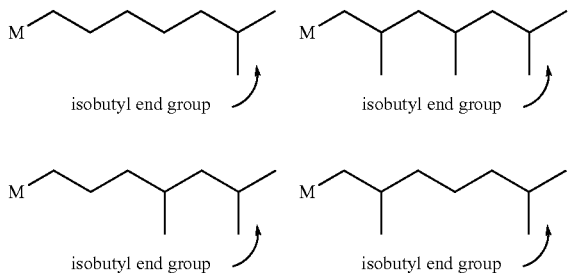

where M represents the polymer chain.

The "isobutyl chain end to allylic vinyl group ratio" is defined to be the ratio of the percentage of isobutyl chain ends to the percentage of allylic vinyl groups.

As used herein, the term "polymer" refers to a chain of monomers having a Mn of 100 g/mol and above.

Reference will now be made to various aspects of the disclosed subject matter in view of the definitions above.

In one aspect, the additives of the disclosed subject matter can interact with the materials in crude oils in a refinery or the like that are prone to cause fouling, e.g., particulate impurities/contaminants and asphaltenes. The interaction can be physical or chemical such as absorption, association, or chemical bonding. The fouling materials can be rendered more soluble in the crude oils as a result of interaction with the antifouling additives, therefore the fouling on the exchanger metal surfaces can be reduced or eliminated.

In accordance with one aspect of the disclosed subject matter, a method for reducing fouling in a hydrocarbon refining process is provided. The method includes (i) providing a crude hydrocarbon for a refining process; and (ii) adding an additive to the crude hydrocarbon, the additive being represented by one of Formula A and Formula B below:

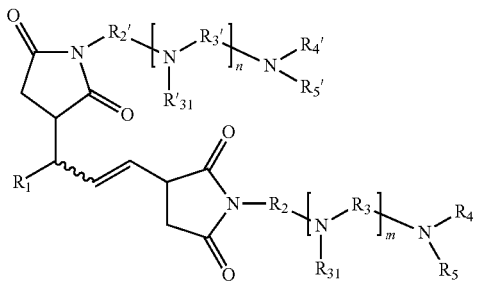

(Formula A)

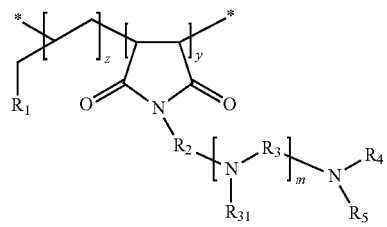

(Formula B)

wherein in each of the Formula A and Formula B above:
m is an integer between 0 and 10 inclusive;
$R_1$ is a branched or straight-chained $C_{10}$-$C_{800}$ alkyl or alkenyl group;
$R_2$ is a $C_1$-$C_4$ branched or straight chained alkylene group;
$R_3$ is a $C_1$-$C_4$ branched or straight chained alkylene group;
$R_{31}$ is hydrogen or —$R_8$-$R_9$, wherein $R_8$ is $C_1$-$C_4$ branched or straight chained alkylene group, and $R_9$ is

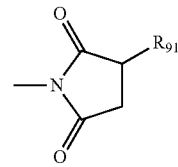

wherein $R_{91}$ is a branched or straight-chained $C_{10}$-$C_{800}$ alkyl or alkenyl group; or $R_8$ and $R_9$ together are a $C_1$-$C_4$ branched or straight chained alkyl group optionally substituted with one or more amine groups; and further wherein the —N($R_{31}$)—$R_3$— repeat unit is optionally interrupted in one or more places by a nitrogen-containing heterocyclic cycloalkyl group; and $R_4$ and $R_5$ are each independently selected from (a) hydrogen; (b) a bond connected to $R_{31}$ in the last distal —N($R_{31}$)—$R_3$— repeat unit; or (c) —$R_6$-$R_7$, wherein $R_6$ is $C_1$-$C_4$ branched or straight chained alkylene group, and $R_7$ is

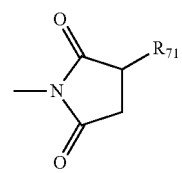

wherein $R_{71}$ is a branched or straight-chained $C_{10}$-$C_{800}$ alkyl or alkenyl group; wherein in Formula A, n is an integer between 0 and 10 inclusive, and the groups $R_2'$, $R_3'$, $R_{31}'$, $R_4'$ and $R_5'$ are each defined the same as $R_2$, $R_3$, $R_{31}$ and $R_4$, and $R_5$, respectively; and wherein in Formula B, z is 1 or 2, and y is an integer between 1 and 5 inclusive.

In certain embodiments, at least one of $R_1$, $R_{71}$, and $R_{91}$ of the compounds shown above comprises polypropylene (PP), which can be atactic polypropylene or isotactic polypropylene. The polypropylene can be amorphous, and can include isotactic or syndiotactic crystallizable units. In some embodiments, the polypropylene includes meso diads constituting from about 30% to about 99.5% of the total diads of the polypropylene. In alternative embodiments, at least one of $R_1$, $R_{71}$, and $R_{91}$ of the compounds above comprises polyethylene (PE).

In a further embodiment, at least one of $R_1$, $R_{71}$, and $R_{91}$ of the compounds above comprises poly(ethylene-co-propylene) (EP). The mole percentage of the ethylene units and propylene units in the poly(ethylene-co-propylene) can vary. For example, in some embodiments, the poly(ethylene-co-propylene) can contain about 1 to about 90 mole % of ethylene units and about 99 to about 10 mole % propylene units. In other embodiments, the poly(ethylene-co-propylene) can contain about 10 to about 90 mole % of ethylene units and about 90 to about 10 mole % propylene units. In certain embodiments, the poly(ethylene-co-propylene) contains about 10 to about 50 mole % of ethylene units.

In some embodiments of the above method, at least one of $R_1$, $R_{71}$, and $R_{91}$ of the additive of Formula I has a number-averaged molecular weight of from about 300 to about 30,000 g/mol (assuming one olefin unsaturation per chain, as measured by $^1$H NMR). Alternatively, at least one of $R_1$, $R_{71}$, and $R_{91}$ of the compounds above has a number-averaged molecular weight of from about 500 to 5,000 g/mol. In one embodiment, the PP or EP included in the $R_1$, $R_{71}$ or $R_{91}$ of the compounds above, individually, has a molecular weight from about 300 to about 30,000 g/mol, or from about 500 to about 5000 g/mol. In one embodiment, the PP or EP groups have a molecular weight, individually, ranging from about 500 to about 2500 g/mol, or a molecular of from about 500 to about 650 g/mol, or a molecular weight of from about 800 to about 1000 g/mol, or a molecular weight of from about 2000 to about 2500 g/mol.

In other embodiments of the compound, at least one of $R_1$, $R_{71}$, and $R_{91}$ comprises poly(higher alpha-olefin) or poly(propylene-co-higher alpha-olefin), the higher alpha-olefin including two or more carbon atoms on each side chain. For example, suitable higher alpha-olefins can include, but are not limited to, 1-butene, 1-pentene, 1-hexene, 1-heptene, 1-octene, 1-nonene, 1-decene, 1-undecene, 1-dodecene, 1-tridecene, 1-tetradecene, 1-hexadecene, 1-octadecene and the like.

In certain embodiments of the above compound, the nitrogen content in the compound of Formula I is about 1 wt % to about 10 wt % based on the total weight of the compound.

In certain embodiments, $R_3$ is $-CH_2-CH_2-$, and $R_{31}$ is hydrogen. In these embodiments, the $-N(R_{31})-R_3-$ repeat unit can be interrupted in one or more places by a 1,4-diethylenediamine.

With reference to Formula A, and in accordance with another aspect of the subject matter disclosed herein, a method for preparing a compound for treating an emulsion of crude hydrocarbon in a hydrocarbon refining process is provided. The method includes:

(a) reacting a polymer base unit $R_{11}$, which is a branched or straight-chained $C_{10}$-$C_{800}$ alkyl or alkenyl group having a vinyl terminal group, with maleic anhydride to obtain a polymer represented by Formula I below:

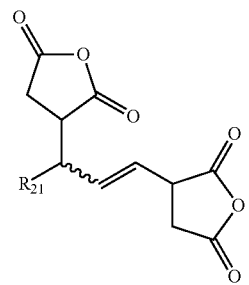

wherein $R_{21}$ is a branched or straight-chained $C_{10}$-$C_{800}$ alkyl or alkenyl group;

(b) reacting the polymer obtained in (a) with a polyamine represented by

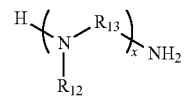

wherein $R_{12}$ is hydrogen or a $C_1$-$C_4$ branched or straight chained alkyl optionally substituted with one or more amine groups, $R_{13}$ is a $C_1$-$C_4$ branched or straight chained alkylene group, and x is an integer between 1 and 10, and further wherein the $-N(R_{12})-R_{13}-$ unit is optionally interrupted in one or more places by a nitrogen-containing heterocyclic cycloalkyl group, and wherein when the x-th $-N(R_{12})-R_{13}-$ unit along with the terminal nitrogen atom forms a heterocyclic cycloalkyl group, the terminal $-NH_2$ is replaced by a $-NH-$ group for valency.

In certain embodiments of the above methods, the polymer base unit $R_{11}$ has a number-averaged molecular weight of 300 to 30,000 g/mol (assuming one olefin unsaturation per chain, as measured by $^1$H NMR), and alternatively, about 500 to 5,000 g/mol.

In some embodiments of the above methods, the polymer base unit $R_{11}$ comprises polypropylene. The polypropylene can be either atactic polypropylene or isotactic polypropylene. The polypropylene can be amorphous, and can include isotactic or syndiotactic crystallizable units. In some embodiments, the polypropylene includes meso diads constituting from about 30% to about 99.5% of the total diads of the polypropylene. The polymer base unit $R_{11}$ can also comprise polyethylene.

In alternative embodiments, the polymer base unit $R_{11}$ comprises poly(ethylene-co-propylene). The poly(ethylene-co-propylene) can contain from about 1 or 10 mole % to about 90 or 99 mole % of ethylene units and from about 99 or 90 mole % to about 10 or 1 mole % propylene units. In one embodiment, the poly(ethylene-co-propylene) polymer contains from about 2 or 20 mole % to about 50 mole % ethylene units.

In one embodiment, the PP or EP included in $R_{11}$ to form Formula I individually has a number-averaged molecular weight ($M_n$) molecular weight from about 300 to about 30,000 g/mol, or from about 500 to about 5000 g/mol (assuming one olefin unsaturation per chain, as measured by $^1$H NMR). In one embodiment, the PP or EP groups have a molecular weight, individually, ranging from about 500 to about 2500 g/mol, or a molecular of from about 500 to about 650 g/mol, or a molecular weight of from about 800 to about 1000 g/mol, or a molecular weight of from about 2000 to about 2500 g/mol.

In embodiments where the polymer base unit $R_{11}$ includes polypropylene or poly(ethylene-co-propylene), such groups can be prepared, for example, by metallocene-catalyzed polymerization of propylene or a mixture of ethylene and propylene, which are then terminated with a high vinyl group content in the chain end. The number-averaged molecular weight ($M_n$) of the PP or EP can be from about 300 to about 30,000 g/mol, as determined by $^1$H NMR spectroscopy. The vinyl-terminated atactic or isotactic polypropylenes (v-PP) or vinyl-terminated poly(ethylene-co-propylene) (v-EP) suitable for further chemical functionalization can have a molecular weight ($M_n$) approximately from about 300 to about 30,000 g/mol, and preferably about 500 to 5,000 g/mol. The terminal olefin group can be a vinylidene group or an allylic vinyl group (both covered in Formula I). In certain embodiments, the terminal olefin group is an allylic vinyl group. In this regard, the terminal allylic vinyl group rich PP or EP as disclosed in co-pending applications, U.S. Patent Application Publication Nos. 20090318644 and 20090318646, can be used. U.S. Patent Application Publication Nos. 20090318644 and 20090318646 are both hereby incorporated by reference in their entirety. Some of the vinyl terminated EP or PP according to these co-pending applications contains more than 90% of allylic terminal vinyl group.

In some embodiments of the above methods, $R_{11}$ can comprise propylene and less than 0.5 wt % comonomer, preferably 0 wt % comonomer, wherein the $R_{11}$ has: i) at least 93% allyl chain ends (preferably at least 95%, preferably at least 97%, preferably at least 98%); ii) a number average molecular weight (Mn) of about 500 to about 20,000 g/mol, as measured by $^1$H NMR, assuming one olefin unsaturation per chain (preferably 500 to 15,000, preferably 700 to 10,000, preferably 800 to 8,000 g/mol, preferably 900 to 7,000, preferably 1000 to 6,000, preferably 1000 to 5,000); iii) an isobutyl chain end to allylic vinyl group ratio of 0.8:1 to 1.3:1.0; iv) less than 1400 ppm aluminum, (preferably less than 1200 ppm, preferably less than 1000 ppm, preferably less than 500 ppm, preferably less than 100 ppm).

In some embodiments of the above methods, $R_{11}$ can comprise a propylene copolymer having an Mn of 300 to 30,000 g/mol as measured by 1H NMR and assuming one olefin unsaturation per chain (preferably 400 to 20,000, preferably 500 to 15,000, preferably 600 to 12,000, preferably 800 to 10,000, preferably 900 to 8,000, preferably 900 to 7,000 g/mol), comprising 10 to 90 mol % propylene (preferably 15 to 85 mol %, preferably 20 to 80 mol %, preferably 30 to 75 mol %, preferably 50 to 90 mol %) and 10 to 90 mol % (preferably 85 to 15 mol %, preferably 20 to 80 mol %, preferably 25 to 70 mol %, preferably 10 to 50 mol %) of one or more alpha-olefin comonomers (preferably ethylene, butene, hexene, or octene, preferably ethylene), wherein the polymer has at least X % allyl chain ends (relative to total unsaturations), where: 1) X=(−0.94 (mole % ethylene incorporated)+100{alternately 1.20 (−0.94 (mole % ethylene incorporated)+100), alternately 1.50(−0.94 (mole % ethylene incorporated)+100)}), when 10 to 60 mole % ethylene is present in the co-polymer, and 2) X=45 (alternately 50, alternately 60), when greater than 60 and less than 70 mole % ethylene is present in the co-polymer, and 3) X=(1.83*(mole % ethylene incorporated)−83, {alternately 1.20 [1.83*(mole % ethylene incorporated)−83], alternately 1.50 [1.83*(mole % ethylene incorporated)−83]}), when 70 to 90 mole % ethylene is present in the copolymer. Alternately X is 80% or more, preferably 85% or more, preferably 90% or more, preferably 95% or more. Alternatively, $R_{11}$ can have at least 80% isobutyl chain ends (based upon the sum of isobutyl and n-propyl saturated chain ends), preferably at least 85% isobutyl chain ends, preferably at least 90% isobutyl chain ends. Alternately, $R_{11}$ can have an isobutyl chain end to allylic vinyl group ratio of 0.8:1 to 1.35:1.0, preferably 0.9:1 to 1.20:1.0, preferably 0.9:1.0 to 1.1:1.0.

In other embodiments, $R_{11}$ can comprise a polypropylene copolymer having more than 90 mol % propylene (preferably 95 to 99 mol %, preferably 98 to 9 mol %) and less than 10 mol % ethylene (preferably 1 to 4 mol %, preferably 1 to 2 mol %), wherein the copolymer has: at least 93% allyl chain ends (preferably at least 95%, preferably at least 97%, preferably at least 98%); a number average molecular weight (Mn) of about 400 to about 30,000 g/mol, as measured by $^1$H NMR and assuming one olefin unsaturation per chain (preferably 500 to 20,000, preferably 600 to 15,000, preferably 700 to 10,000 g/mol, preferably 800 to 9,000, preferably 900 to 8,000, preferably 1000 to 6,000); an isobutyl chain end to allylic vinyl group ratio of 0.8:1 to 1.35:1.0, and less than 1400 ppm aluminum, (preferably less than 1200 ppm, preferably less than 1000 ppm, preferably less than 500 ppm, preferably less than 100 ppm).

In alternative embodiments, $R_{11}$ can comprise a polypropylene copolymer comprising: at least 50 (preferably 60 to 90, preferably 70 to 90) mol % propylene and from 10 to 50 (preferably 10 to 40, preferably 10 to 30) mol % ethylene, wherein the polymer has: at least 90% allyl chain ends (preferably at least 91%, preferably at least 93%, preferably at least 95%, preferably at least 98%); an Mn of about 150 to about 20,000 g/mol, as measured by $^1$H NMR and assuming one olefin unsaturation per chain (preferably 200 to 15,000, preferably 250 to 15,000, preferably 300 to 10,000, preferably 400 to 9,500, preferably 500 to 9,000, preferably 750 to 9,000); and an isobutyl chain end to allylic vinyl group ratio of 0.8:1 to 1.3:1.0, wherein monomers having four or more carbon atoms are present at from 0 to 3 mol % (preferably at less than 1 mol %, preferably less than 0.5 mol %, preferably at 0 mol %).

In further embodiments, $R_{11}$ can comprise a polypropylene copolymer comprising: at least 50 (preferably at least 60, preferably 70 to 99.5, preferably 80 to 99, preferably 90 to 98.5) mol % propylene, from 0.1 to 45 (preferably at least 35, preferably 0.5 to 30, preferably 1 to 20, preferably 1.5 to 10) mol % ethylene, and from 0.1 to 5 (preferably 0.5 to 3, preferably 0.5 to 1) mol % $C_4$ to $C_{12}$ olefin (such as butene, hexene or octene, preferably butene), wherein the polymer has: at least 90% allyl chain ends (preferably at least 91%, preferably at least 93%, preferably at least 95%, preferably at least 98%); a number average molecular weight (Mn) of about 150 to about 15,000 g/mol, as measured by $^1$H NMR and assuming one olefin unsaturation per chain (preferably 200 to 12,000, preferably 250 to 10,000, preferably 300 to 10,000, preferably 400 to 9500, preferably 500 to 9,000, preferably 750 to 9,000); and an isobutyl chain end to allylic vinyl group ratio of 0.8:1 to 1.35:1.0.

In certain embodiments, $R_{11}$ can comprise a polypropylene copolymer comprising: at least 50 (preferably at least 60, preferably 70 to 99.5, preferably 80 to 99, preferably 90 to 98.5) mol % propylene, from 0.1 to 45 (preferably at least 35, preferably 0.5 to 30, preferably 1 to 20, preferably 1.5 to 10) mol % ethylene, and from 0.1 to 5 (preferably 0.5 to 3, preferably 0.5 to 1) mol % diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the polymer has: at least 90% allyl chain ends (preferably at least 91%, preferably at least 93%, preferably at least 95%, preferably at least 98%); a number average molecular weight (Mn) of about 150 to about 20,000 g/mol, as measured by $^1$H NMR and assuming one olefin unsaturation per chain (preferably 200 to 15,000, preferably 250 to 12,000, preferably 300 to 10,000, preferably 400 to 9,500, preferably 500 to 9,000, preferably 750 to 9,000); and an isobutyl chain end to allylic vinyl group ratio of 0.7:1 to 1.35:1.0.

In other embodiments of the above methods, $R_{11}$ can comprise poly(higher alpha-olefin) or polypropylene-co-higher alpha-olefin), the higher alpha-olefin including two or more carbon atoms on each side chain. For example, suitable higher alpha-olefins can include, but are not limited to, 1-butene, 1-pentene, 1-hexene, 1-heptene, 1-octene, 1-nonene, 1-decene, 1-undecene, 1-dodecene, 1-tridecene, 1-tetradecene, 1-hexadecene, 1-octadecene and the like.

In certain embodiments, $R_{11}$ includes those vinyl terminated macromonomers disclosed in U.S. Patent Application Publication Nos. 20120245312, 20120245310, 20120245311, 20120245313, and U.S. Provisional Application No. 61/704,604, the disclosure of each of which is incorporated by reference in its entirety herein.

In the above method of preparation, maleic anhydride can be used for the reaction of converting a polymer base unit $R_{11}$ having a terminal vinyl functionality to a compound of Formula I. The reaction can proceed through a thermal condition (e.g., at temperature of about 150° C. to 260° C.) without using external radical providers, such as an peroxide initiator. Under this condition, a compound of Formula I can be obtained, along with a polymer having a mono-succinic anhydride terminal group. For example and as embodied herein, the thermal reaction between $R_{11}$ and maleic anhydride can be illustrated below in Scheme 1 using a vinyl terminated polypropylene as an example of $R_{11}$.

The above reaction can be carried out without the use of any solvent. Alternatively, any inert solvent (e.g., paraffinic solvent, naphthenic solvent, aromatic solvent, halogenated solvent, mineral oil, synthetic fluid, etc.) with appropriate boiling point or boiling point range can be used. The reaction can be conducted in an open system under atmospheric pressure by using standard laboratory glassware or in a closed system by using an autoclave (or any sealed vessel suitable for holding the pressure). A catalyst can also be used to increase the rate of reaction between the hydrocarbon copolymer and the unsaturated carboxylic acid derivative.

The vinyl terminated polymer can also be a copolymer of polypropylene, for example, poly-ethylene-propylene, or poly-propylene-higher alpha-olefin. In such cases, the reactions under a thermal condition can be illustrated below in Scheme 2 and Scheme 3, respectively.

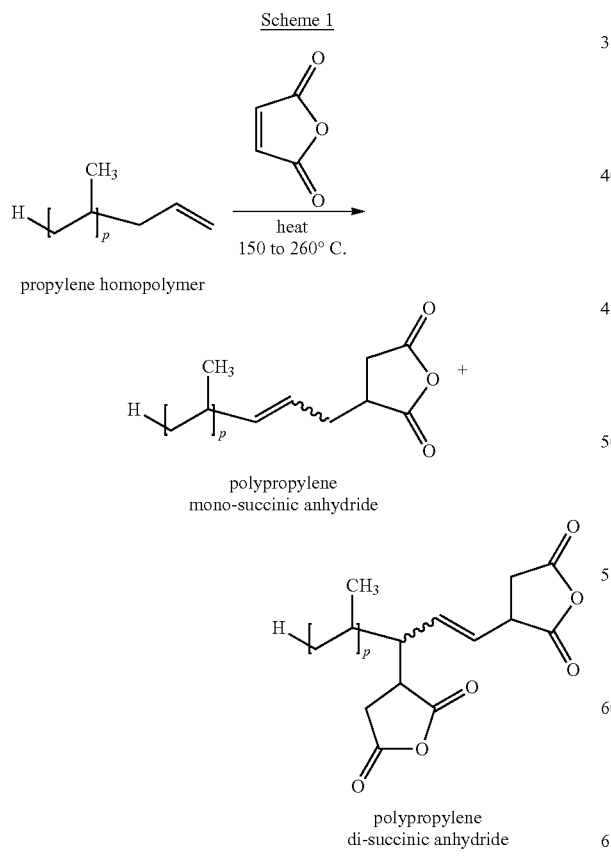

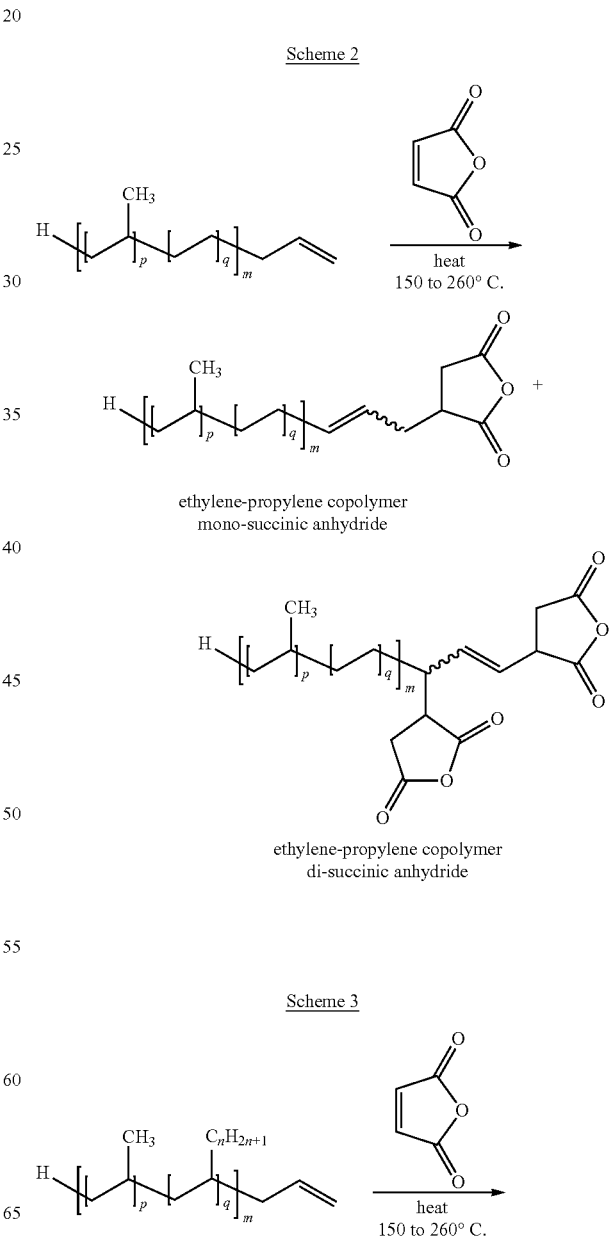

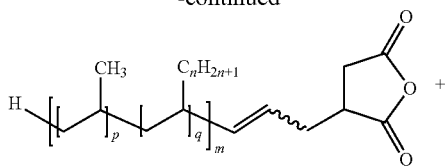

propylene-higher alpha olefin copolymer mono-succinic anhydride

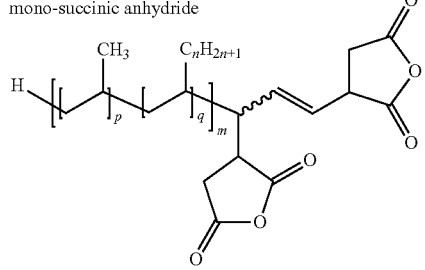

propylene-higher alpha olefin copolymer di-succinic anhydride (n = 2, 3, 4 ...)

The method of preparing the compound B can include reacting the succinic anhydride-containing polymers obtained above with a polyamine (PAM). The reaction can proceed through a condensation mechanism. The polyamine can include linear, branched or cyclic isomers of an oligomer of ethyleneamine, or mixtures thereof, wherein each two neighboring nitrogens in the oligomer of ethyleneamine are bridged by one or two ethyleneamine groups. For example, the polyamine can be selected from polyethyleneamines with general molecular formula $H_2N(CH_2CH_2NH)_xH$ (where $x=1, 2, 3, \ldots$) such as ethylenediamine, diethylenetriamine, triethylenetetramine, tetraethylenepentamine, pentaethylenehexamine, hexaethyleneheptamine, and mixtures thereof. In some embodiments, the polyamine can comprise a heavy polyamine, such as polyethyleneamine heavy bottoms available from Dow Chemical as "Heavy Polyamine X" or HPA-X.

Using a reaction between the products of Scheme 3 and tetraethylenepentamine as an example of PAM, the condensation reaction can be illustrated below in Scheme 4.

Scheme 4

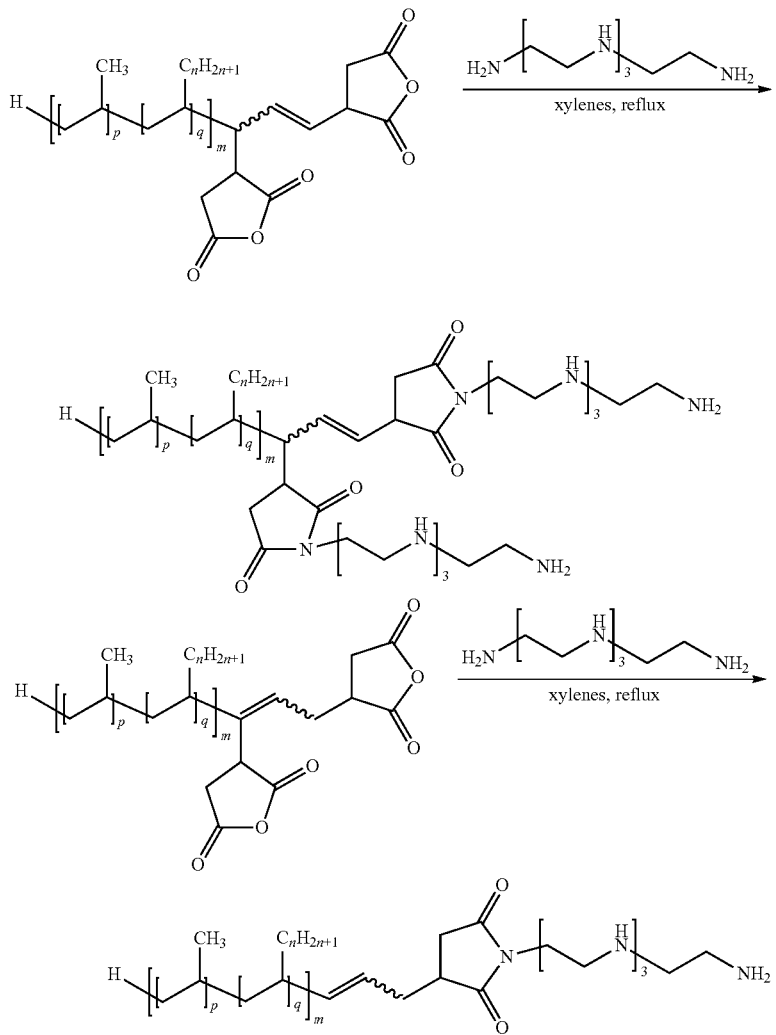

In additional embodiments of the disclosed subject matter, nucleophilic reagents other than polyamines can be used to functionalize the compounds of Formula I. These reagents include, for example, monoamines, diamines, amino alcohols, polyetheramines, polyols, polyalkylene glycols, polyalkylene polyamine and the like.

Furthermore, vinylidene-terminated polymer or copolymer (e.g., ethylene-propylene copolymer, and propylene-higher alpha-olefin copolymer) can also be used as $R_{11}$. Illustrations for using vinylidene-terminated polypropylene and vinylidene-terminated propylene-higher alpha-olefin copolymer as $R_{11}$ are shown below in Scheme 5 and Scheme 6, respectively.

Scheme 5

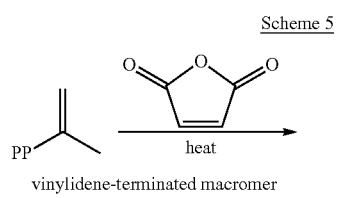
vinylidene-terminated macromer

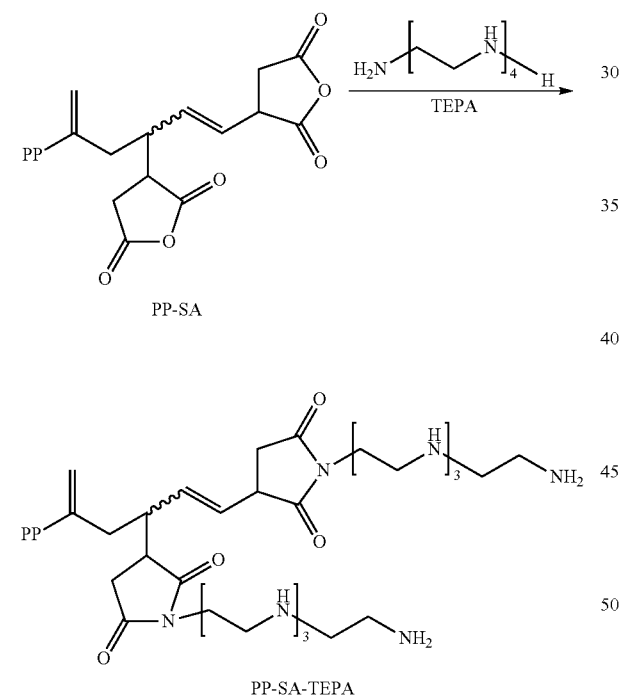
PP-SA

PP-SA-TEPA

PP = polypropylene

Scheme 6

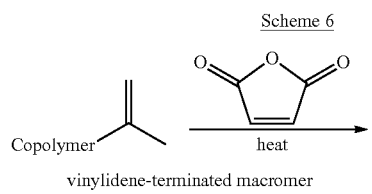
vinylidene-terminated macromer

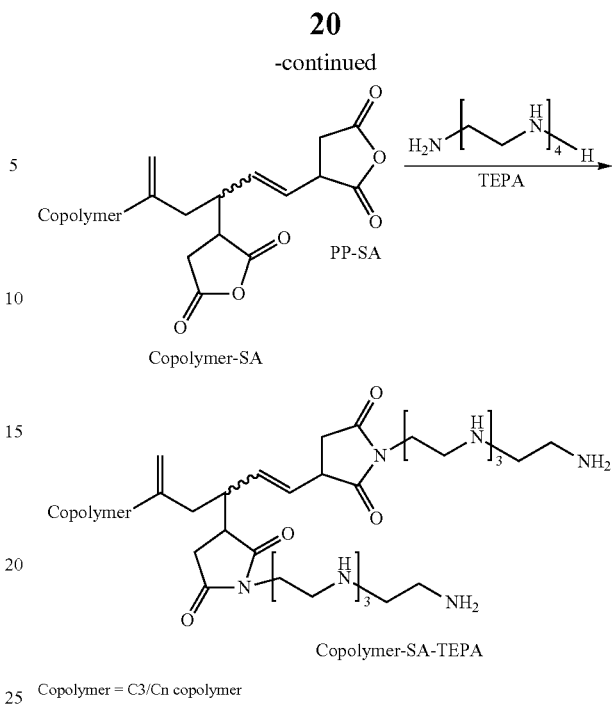
Copolymer-SA

Copolymer-SA-TEPA

Copolymer = C3/Cn copolymer

As a result of the amination reactions, the number of polymer chain attached to each polyamine molecule can vary from one to two to three or more. In addition, both primary and secondary amino groups on the polyamine can participate in the reaction with the anhydride-functionalized polymer. Other commercially available lower or higher polyamines with linear, branched, cyclic or heterocyclic structures can also be used. It is well-known and understood by those skilled in the art that these polyamines can be mixtures of compounds comprised of molecules with a distribution of chain lengths, different level and type of amine (primary, secondary, and tertiary) functional groups, and varying degree of linear, branched and cyclic structures. For example, possible isomers for tetraethylenepentamine include the following:

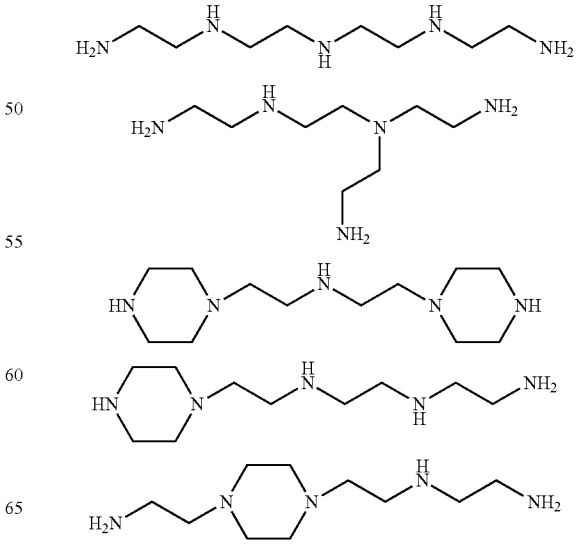

-continued

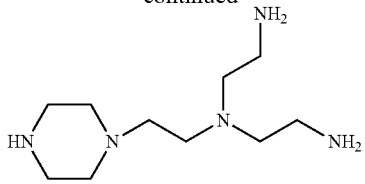

As the molecular weight of polyamines increases, the number of possible isomers increases as well.

In a further aspect, a method for preparing a compound according to Formula B for treating an emulsion of crude hydrocarbon in a hydrocarbon refining process is provided. The method includes:

(a) reacting a polymer base unit $R_{11}$, which is a branched or straight-chained $C_{10}$-$C_{800}$ alkyl or alkenyl group having a vinyl terminal group, with maleic anhydride to obtain a polymer represented by Formula II below:

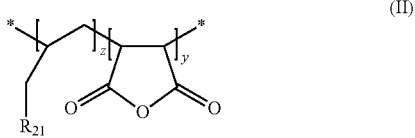

(II)

wherein $R_{21}$ is a branched or straight-chained $C_{10}$-$C_{800}$ alkyl or alkenyl group, z is 1 or 2, and y is an integer between 1 and 5 inclusive;

(b) reacting the polymer obtained in (a) with a polyamine represented by

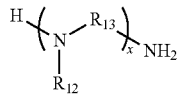

wherein $R_{12}$ is hydrogen or a $C_1$-$C_4$ branched or straight chained alkyl optionally substituted with one or more amine groups, $R_{13}$ is a $C_1$-$C_4$ branched or straight chained alkylene group, and x is an integer between 1 and 10, and further wherein the —N($R_{12}$)—$R_{13}$— unit is optionally interrupted in one or more places by a nitrogen-containing heterocyclic cycloalkyl group, and wherein when the x-th —N($R_{12}$)—$R_{13}$— unit along with the terminal nitrogen atom forms a heterocyclic cycloalkyl group, the terminal —$NH_2$ is replaced by a —NH— group for valency.

In certain embodiments of the above methods, the polymer base unit $R_{11}$ has a number-averaged molecular weight of 300 to 30,000 g/mol (assuming one olefin unsaturation per chain, as measured by $^1$H NMR), and alternatively, about 500 to 5,000 g/mol.

In some embodiments of the above methods, the polymer base unit $R_{11}$ comprises polypropylene. The polypropylene can be either atactic polypropylene or isotactic polypropylene. The polypropylene can be amorphous, and can include isotactic or syndiotactic crystallizable units. In some embodiments, the polypropylene includes meso diads constituting from about 30% to about 99.5% of the total diads of the polypropylene. The polymer base unit $R_{11}$ can also comprise polyethylene.

In alternative embodiments, the polymer base unit $R_{11}$ comprises poly(ethylene-co-propylene). The poly(ethylene-co-propylene) can contain from about 1 or 10 mole % to about 90 or 99 mole % of ethylene units and from about 99 or 90 mole % to about 10 or 1 mole % propylene units. In one embodiment, the poly(ethylene-co-propylene) polymer contains from about 2 or 20 mole % to about 50 mole % ethylene units.

In one embodiment, the PP or EP included in the $R_{11}$ to form Formula I individually has a number-averaged molecular weight ($M_n$) molecular weight from about 300 to about 30,000 g/mol, or from about 500 to about 5000 g/mol (assuming one olefin unsaturation per chain, as measured by $^1$H NMR). In one embodiment, the PP or EP groups have a molecular weight, individually, ranging from about 500 to about 2500 g/mol, or a molecular of from about 500 to about 650 g/mol, or a molecular weight of from about 800 to about 1000 g/mol, or a molecular weight of from about 2000 to about 2500 g/mol.

In embodiments where the polymer base unit $R_{11}$ include polypropylene or poly(ethylene-co-propylene), such groups can be prepared, for example, by metallocene-catalyzed polymerization of propylene or a mixture of ethylene and propylene, which are then terminated with a high vinyl group content in the chain end. The number-averaged molecular weight ($M_n$) of the PP or EP can be from about 300 to about 30,000 g/mol, as determined by $^1$H NMR spectroscopy. The vinyl-terminated atactic or isotactic polypropylenes (v-PP) or vinyl-terminated poly(ethylene-co-propylene) (v-EP) suitable for further chemical functionalization can have a molecular weight ($M_n$) approximately from about 300 to about 30,000 g/mol, and preferably about 500 to 5,000 g/mol. The terminal olefin group can be a vinylidene group or an allylic vinyl group. In certain embodiments, the terminal olefin group is an allylic vinyl group. In this regard, the terminal allylic vinyl group rich PP or EP as disclosed in co-pending applications, U.S. Patent Application Publication Nos. 20090318644 and 20090318646, can be used, each of which is hereby incorporated by reference in its entirety. Some of the vinyl terminated EP or PP according to these co-pending applications contains more than 90% of allylic terminal vinyl group.

In some embodiments of the above methods, $R_{11}$ can comprise propylene and less than 0.5 wt % comonomer, preferably 0 wt % comonomer, wherein the $R_{11}$ has: i) at least 93% allyl chain ends (preferably at least 95%, preferably at least 97%, preferably at least 98%); ii) a number average molecular weight (Mn) of about 500 to about 20,000 g/mol, as measured by $^1$H NMR, assuming one olefin unsaturation per chain (preferably 500 to 15,000, preferably 700 to 10,000, preferably 800 to 8,000 g/mol, preferably 900 to 7,000, preferably 1000 to 6,000, preferably 1000 to 5,000); iii) an isobutyl chain end to allylic vinyl group ratio of 0.8:1 to 1.3:1.0; iv) less than 1400 ppm aluminum, (preferably less than 1200 ppm, preferably less than 1000 ppm, preferably less than 500 ppm, preferably less than 100 ppm).

In some embodiments of the above methods, $R_{11}$ can comprise a propylene copolymer having an Mn of 300 to 30,000 g/mol as measured by $^1$H NMR and assuming one olefin unsaturation per chain (preferably 400 to 20,000, preferably 500 to 15,000, preferably 600 to 12,000, preferably 800 to 10,000, preferably 900 to 8,000, preferably 900 to 7,000 g/mol), comprising 10 to 90 mol % propylene (preferably 15 to 85 mol %, preferably 20 to 80 mol %, preferably 30 to 75 mol %, preferably 50 to 90 mol %) and 10 to 90 mol % (preferably 85 to 15 mol %, preferably 20 to 80 mol %, preferably 25 to 70 mol %, preferably 10 to 50 mol %) of one or more alpha-olefin comonomers (preferably ethylene, butene, hexene, or octene, preferably ethylene), wherein the polymer has at least X % allyl chain ends (relative to total unsaturations), where: 1) X=(−0.94 (mole % ethylene incorporated)+100{alternately 1.20 (−0.94 (mole % ethylene incorporated)+100), alternately 1.50(−0.94 (mole % ethylene incorporated)+100)}), when 10 to 60 mole % ethylene is present in the co-polymer, and 2) X=45 (alternately 50, alternately 60), when greater than 60 and less than 70 mole % ethylene is present in the co-polymer, and 3) X=(1.83*(mole % ethylene incorporated)−83, {alternately 1.20 [1.83*(mole % ethylene incorporated)−83], alternately 1.50 [1.83*(mole % ethylene incorporated)−83]}), when 70 to 90 mole % ethylene is present in the copolymer. Alternately X is 80% or more, preferably 85% or more, preferably 90% or more, preferably 95% or more. Alternatively, $R_{11}$ can have at least 80% isobutyl chain ends (based upon the sum of isobutyl and n-propyl saturated chain ends), preferably at least 85% isobutyl chain ends, preferably at least 90% isobutyl chain ends. Alternately, $R_{11}$ can have an isobutyl chain end to allylic vinyl group ratio of 0.8:1 to 1.35:1.0, preferably 0.9:1 to 1.20:1.0, preferably 0.9:1.0 to 1.1:1.0.

In other embodiments, $R_{11}$ can comprise a polypropylene copolymer having more than 90 mol % propylene (preferably 95 to 99 mol %, preferably 98 to 9 mol %) and less than 10 mol % ethylene (preferably 1 to 4 mol %, preferably 1 to 2 mol %), wherein the copolymer has: at least 93% allyl chain ends (preferably at least 95%, preferably at least 97%, preferably at least 98%); a number average molecular weight (Mn) of about 400 to about 30,000 g/mol, as measured by $^{1}$H NMR and assuming one olefin unsaturation per chain (preferably 500 to 20,000, preferably 600 to 15,000, preferably 700 to 10,000 g/mol, preferably 800 to 9,000, preferably 900 to 8,000, preferably 1000 to 6,000); an isobutyl chain end to allylic vinyl group ratio of 0.8:1 to 1.35:1.0, and less than 1400 ppm aluminum, (preferably less than 1200 ppm, preferably less than 1000 ppm, preferably less than 500 ppm, preferably less than 100 ppm).

In alternative embodiments, $R_{11}$ can comprise a polypropylene copolymer comprising: at least 50 (preferably 60 to 90, preferably 70 to 90) mol % propylene and from 10 to 50 (preferably 10 to 40, preferably 10 to 30) mol % ethylene, wherein the polymer has: at least 90% allyl chain ends (preferably at least 91%, preferably at least 93%, preferably at least 95%, preferably at least 98%); an Mn of about 150 to about 20,000 g/mol, as measured by $^{1}$H NMR and assuming one olefin unsaturation per chain (preferably 200 to 15,000, preferably 250 to 15,000, preferably 300 to 10,000, preferably 400 to 9,500, preferably 500 to 9,000, preferably 750 to 9,000); and an isobutyl chain end to allylic vinyl group ratio of 0.8:1 to 1.3:1.0, wherein monomers having four or more carbon atoms are present at from 0 to 3 mol % (preferably at less than 1 mol %, preferably less than 0.5 mol %, preferably at 0 mol %).

In further embodiments, $R_{11}$ can comprise a polypropylene copolymer comprising: at least 50 (preferably at least 60, preferably 70 to 99.5, preferably 80 to 99, preferably 90 to 98.5) mol % propylene, from 0.1 to 45 (preferably at least 35, preferably 0.5 to 30, preferably 1 to 20, preferably 1.5 to 10) mol % ethylene, and from 0.1 to 5 (preferably 0.5 to 3, preferably 0.5 to 1) mol % $C_4$ to $C_{12}$ olefin (such as butene, hexene or octene, preferably butene), wherein the polymer has: at least 90% allyl chain ends (preferably at least 91%, preferably at least 93%, preferably at least 95%, preferably at least 98%); a number average molecular weight (Mn) of about 150 to about 15,000 g/mol, as measured by $^{1}$H NMR and assuming one olefin unsaturation per chain (preferably 200 to 12,000, preferably 250 to 10,000, preferably 300 to 10,000, preferably 400 to 9500, preferably 500 to 9,000, preferably 750 to 9,000); and an isobutyl chain end to allylic vinyl group ratio of 0.8:1 to 1.35:1.0.

In certain embodiments, $R_{11}$ can comprise a polypropylene copolymer comprising: at least 50 (preferably at least 60, preferably 70 to 99.5, preferably 80 to 99, preferably 90 to 98.5) mol % propylene, from 0.1 to 45 (preferably at least 35, preferably 0.5 to 30, preferably 1 to 20, preferably 1.5 to 10) mol % ethylene, and from 0.1 to 5 (preferably 0.5 to 3, preferably 0.5 to 1) mol % diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the polymer has: at least 90% allyl chain ends (preferably at least 91%, preferably at least 93%, preferably at least 95%, preferably at least 98%); a number average molecular weight (Mn) of about 150 to about 20,000 g/mol, as measured by $^{1}$H NMR and assuming one olefin unsaturation per chain (preferably 200 to 15,000, preferably 250 to 12,000, preferably 300 to 10,000, preferably 400 to 9,500, preferably 500 to 9,000, preferably 750 to 9,000); and an isobutyl chain end to allylic vinyl group ratio of 0.7:1 to 1.35:1.0.

In other embodiments of the above methods, $R_{11}$ can comprise poly(higher alpha-olefin) or polypropylene-co-higher alpha-olefin), the higher alpha-olefin including two or more carbon atoms on each side chain. For example, suitable higher alpha-olefins can include, but are not limited to, 1-butene, 1-pentene, 1-hexene, 1-heptene, 1-octene, 1-nonene, 1-decene, 1-undecene, 1-dodecene, 1-tridecene, 1-tetradecene, 1-hexadecene, 1-octadecene and the like.

In certain embodiments, $R_{11}$ includes those vinyl terminated macromonomers disclosed in U.S. Patent Application Publication Nos. 20120245312, 20120245310, 20120245311, 20120245313, and U.S. Provisional Application No. 61/704,604, the disclosure of each of which is incorporated by reference in its entirety herein.

In the disclosed method of preparation of Compound B, maleic anhydride can be used for the reaction of converting a polymer base unit $R_{11}$ having a terminal vinyl functionality to a compound of Formula II. The reaction between $R_{11}$ and maleic anhydride can be initiated by a peroxide initiator which provides a radical species. The reaction under this condition can result in Formula II noted above, as illustrated below in Scheme 7:

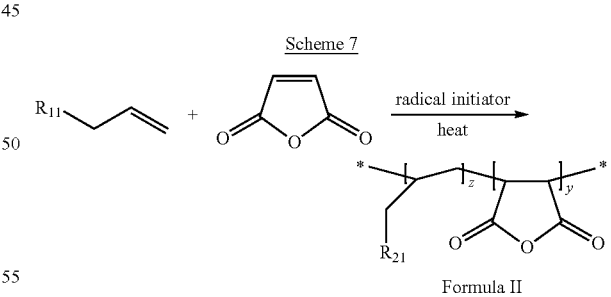

Scheme 7

Formula II

As previously noted, the method of preparing the compounds can include reacting the succinic anhydride-containing polymers obtained above with a polyamine. The reaction can proceed through a condensation mechanism. The polyamine can include linear, branched or cyclic isomers of an oligomer of ethyleneamine, or mixtures thereof, wherein each two neighboring nitrogens in the oligomer of ethyleneamine are bridged by one or two ethyleneamine groups. For example, the polyamine can be selected from polyethyleneamines with general molecular formula $H_2N(CH_2CH_2$ $NH)_xH$ (where x=1, 2, 3, ...) such as ethylenediamine, diethylenetriamine, triethylenetetramine, tetraethylenepentamine, pentaethylenehexamine, hexaethyleneheptamine, and mixtures thereof. In some embodiments, the polyamine can comprise a heavy polyamine, such as polyethyleneamine heavy bottoms available from Dow Chemical as "Heavy Polyamine X" or HPA-X.

Using a reaction between the products of Scheme 7 and tetraethylenepentamine as an exemplary polyamine, the condensation reaction can be illustrated below in Scheme 8.

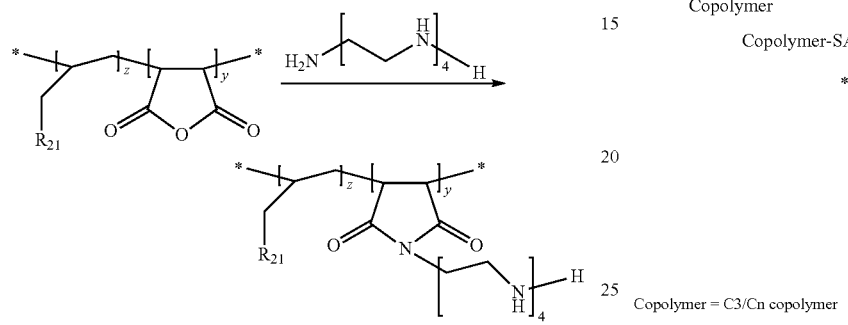

In alternative embodiments, nucleophilic reagents other than polyamines can be used to functionalize the compounds of Formula II. These reagents include, for example, monoamines, diamines, amino alcohols, polyetheramines, polyols, polyalkylene glycols, polyalkylene polyamine and the like.

Furthermore, vinylidene-terminated polymer or copolymer (e.g., ethylene-propylene copolymer, and propylene-higher alpha-olefin copolymer) can also be used as $R_{11}$. Illustrations for using vinylidene-terminated polypropylene and vinylidene-terminated propylene-higher alpha-olefin copolymer as $R_{11}$ are shown below in Scheme 9 and Scheme 10, respectively.

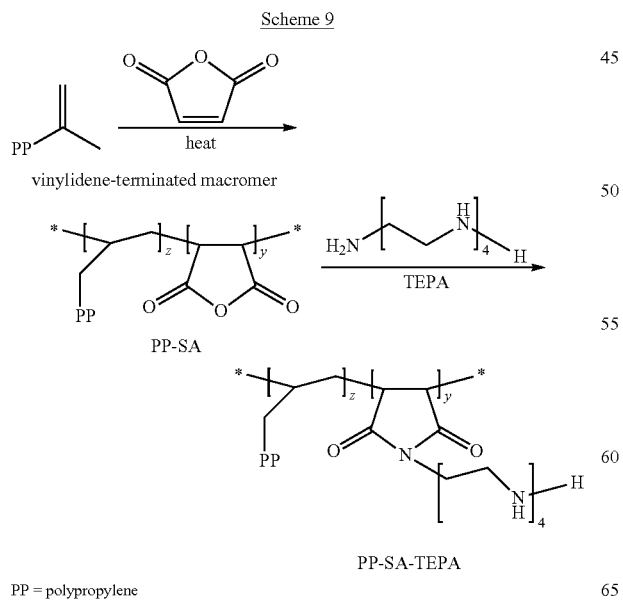

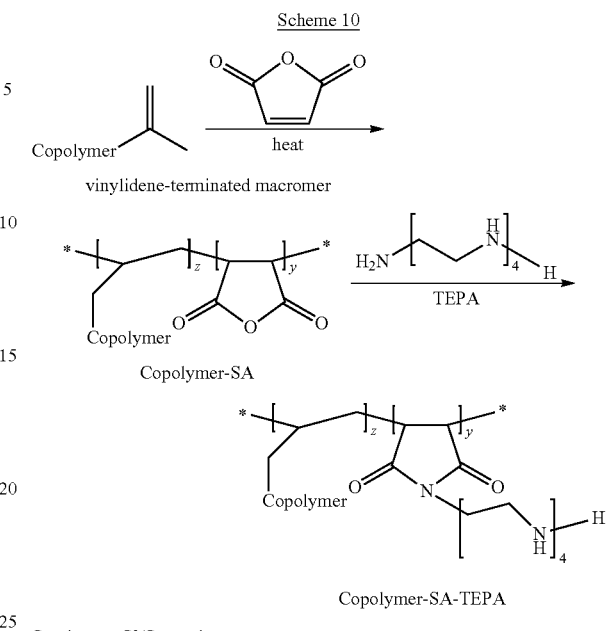

As a result of the amination reactions, the number of polymer chain attached to each polyamine molecule can vary from one to two to three or more. In addition, both primary and secondary amino groups on the polyamine can participate in the reaction with the anhydride-functionalized polymer. Other commercially available lower or higher polyamines with linear, branched, cyclic or heterocyclic structures can also be used. It is well-known and understood by those skilled in the art that these polyamines can be mixtures of compounds comprised of molecules with a distribution of chain lengths, different level and type of amine (primary, secondary, and tertiary) functional groups, and varying degree of linear, branched and cyclic structures. For example, possible isomers for tetraethylenepentamine include the following:

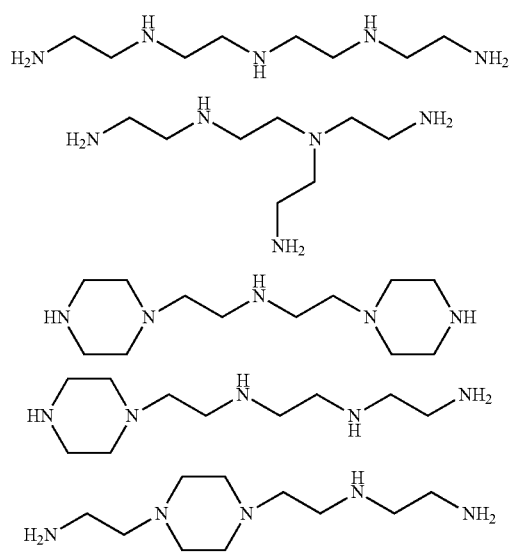

-continued

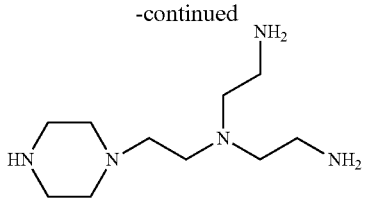

As the molecular weight of polyamines increases, the number of possible isomers increases as well.

In another aspect of the disclosed subject matter, compounds (additives) prepared by the method discussed above and various embodiments thereof are provided.

In another aspect, a method for reducing fouling in a hydrocarbon refining process is provided, which comprises providing a crude hydrocarbon for a refining process, and adding to the crude hydrocarbon an additive of Formula A or Formula B or various embodiments thereof as described above (e.g., at standard operation conditions).

Another aspect of the disclosed subject matter provides a system for refining hydrocarbons that includes at least one crude hydrocarbon refinery component, in which the crude hydrocarbon refinery component includes an additive selected from any one of the additives described herein. The crude hydrocarbon refining component can be selected from a heat exchanger, a furnace, a crude preheater, a coker preheater, a FCC slurry bottom, a debutanizer exchanger, a debutanizer tower, a feed/effluent exchanger, a furnace air preheater, a flare compressor component, a steam cracker, a steam reformer, a distillation column, a fractionation column, a scrubber, a reactor, a liquid-jacketed tank, a pipestill, a coker, and a visbreaker. For example, the crude hydrocarbon refining component can be a heat exchanger (e.g., a crude pre-heat train heat exchanger). Such methods and systems are described in greater details in the following sections and examples.

Another aspect of the disclosed subject matter provides a composition for reducing fouling that includes at least one of any of the above-described additives, and a boronating agent. The boronating agent can be any one or more compounds selected from boric acid, an ortho-borate, or a meta-borate, for example, boric acid, trimethyl metaborate (trimethoxyboroxine), triethyl metaborate, tributyl metaborate, trimethyl borate, triethylborate, triisopropyl borate (triisopropoxyborane), tributyl borate (tributoxyborane) and tri-t-butyl borate. Other boronating agents can be used, such as those disclosed in co-pending applications US20100038290 and US20100170829, each incorporated by reference herein in its entirety.

As disclosed in U.S. Patent Publication No. 20100170829, incorporated herein by reference in its entirety, monosuccinic anhydride compounds which are also suitable for use as antifouling additives can be formed by the methods described above, or, with reference to the method of synthesizing Formula B, by providing heat and not a radical initiator during the reaction of the polymer base unit and the anhydride.

Further Compositions for Reducing Fouling

The additives of the disclosed subject matter can be used in compositions that prevent fouling, including particulate-induced fouling. In addition to the additives of the disclosed subject matter, the compositions can further contain a hydrophobic oil solubilizer for the additive and/or a dispersant for the additive.

Suitable solubilizers can include, for example, surfactants, carboxylic acid solubilizers, such as the nitrogen-containing phosphorous-free carboxylic solubilizers disclosed in U.S. Pat. No. 4,368,133, hereby incorporated by reference in its entirety.

Also as disclosed in U.S. Pat. No. 4,368,133, hereby incorporated by reference in its entirety, surfactants that can be included in compositions of the disclosed subject matter can include, for example, cationic, anionic, nonionic or amphoteric type of surfactant. See, for example, McCutcheon's "Detergents and Emulsifiers", 1978, North American Edition, published by McCutcheon's Division, MC Publishing Corporation, Glen Rock, N.J., U.S.A., including pages 17-33, which is hereby incorporated by reference in its entirety.

The compositions of the disclosed subject matter can further include, for example, viscosity index improvers, antifoamants, antiwear agents, demulsifiers, anti-oxidants, and other corrosion inhibitors.

Furthermore, the additives of the disclosed subject matter can be added with other compatible components that address other problems that can present themselves in an oil refining process known to one of ordinary skill in the art.

Methods of Predicting Need for Antifoulant Additives

In accordance with another aspect of the disclosed subject matter, methods of predicting a need for antifoulant additives, such as described in detail above, in a refinery process are provided. The disclosed method includes characterizing whether the hydrocarbon stream is a non-HSDP crude, performing at least one of (a) determining whether the hydrocarbon stream is subject to filterable solids levels greater than about 100 wppm, or (b) classifying whether the hydrocarbon stream has an expected low flow velocity during normal operating conditions within the refinery, and indicating, using a processor, that anti-fouling additives are recommended if the hydrocarbon stream is characterized to be a non-HSDP crude and either the hydrocarbon stream is determined to be subject to filterable solids levels greater than about 100 wppm or the hydrocarbon stream is classified as having expected low flow within the refinery.

Generally, it has been determined through field studies that specific operational parameters are closely associated with the degree of fouling (and concomitant expense and decreased efficiency) observed during hydrocarbon refinement. In particular, two primary parameters have been determined through these investigations to be associated with increased fouling by a hydrocarbon stream:

(a) low flow velocity within the refinery; and particularly within a heat exchanger; and
(b) crude filterable solids levels within the hydrocarbon stream above 100 wppm.

For example, and without limitation, low flow velocity through heat exchangers was found to be associated with increased deposition of insolubles on the surfaces of the exchanger, while a concentration of filterable solids greater than about 100 wppm in a hydrocarbon stream for refinement in the one or more heat exchangers was likewise observed to be associated with fouling.

Without limitation by theory, low flow velocity is believed to contribute to fouling by permitting relatively prolonged interaction between heat exchanger surfaces and foulants. Such low flow velocities have been determined to be characteristic in shell-and-tube heat exchangers during normal operating conditions when running the hydrocarbon stream through the shell side, rather than the tube side. A result of these expected low flow velocities during normal operating conditions is the refinement of the hydrocarbon stream. Shell-and-tube heat exchangers are common heat exchangers for hydrocarbon refineries, and are composed essentially of a vessel (or shell) and a series of tubes within the shell. The hydrocarbon can flow internally through the tubes with a heated fluid flowing external to the tubes, or the hydrocarbon stream can flow external to the tubes within the shell, and with the heated fluid flowing through the tubes. Without limitation by theory, it is believed that shell-side hydrocarbon flow is less uniform than flow through alternative heat exchanger configurations due at least in part to the presence of stagnant or quiescent zones in the shell side, such as those near vertical baffles. Hydrocarbon velocities through the shell side therefore are lower than the hydrocarbon velocities though the tube side of such exchanges, thus permitting foulant deposition and buildup on the inner surfaces of the exchanger.

As such, a flow velocity lower than 3 feet per second can classified as a low flow velocity. In further embodiments, classifying whether the hydrocarbon stream has an expected low flow velocity during normal operating conditions within a heat exchanger of the refinery comprises determining whether the hydrocarbon stream has a shell-side flow through a shell side of a shell-and-tube heat exchanger, wherein shell-side flow indicates an expected low flow condition of the hydrocarbon stream.

Regarding the second identified parameter referenced above, filterable solids in a hydrocarbon stream are insoluble solid particulates that are typically suspended in the liquid phase of a hydrocarbon stream. Representative solids include, by way of example and not limitation, asphaltenes, mineral ash-forming impurities, coal coke, carbonaceous solids, catalyst and spent shale fines, natural and synthetic mineral oxides, organic and inorganic salts, and mixtures thereof. One standard protocol for the measurement of filterable solids is defined by ASTM-D4870 entitled "Standard Test Method for Determination of Total Sediment in Residual Fuels." Further methods, including the method disclosed in U.S. Patent Publication No. 2011/0265558, hereby incorporated by reference in its entirety, can also be used to determine the concentration and particle size distribution of filterable solids in a hydrocarbon stream.

Such solids commonly precipitate and adhere to the hot surfaces of heat exchangers in the crude pre-heat train. Prolonged exposure to such high surface temperatures causes thermal degradation of the precipitated organic solids (asphaltenes) to coke, which acts as an insulator and results in heat transfer efficiency losses in the heat exchanger by preventing the heat exchanger surfaces from heating the hydrocarbon streams running through the units.

It has been determined that desalting can be effective for removal of filterable solids from hydrocarbon streams for downstream refinement. Desalting often can be an initial step in crude refining to remove salts and particulates to reduce corrosion, fouling and catalyst poisoning. In a typical desalting process, fresh water is mixed with oil to produce a water-in-oil emulsion which in turn extracts salt and brine and some particulates from oil. The salty emulsion is then directed to a desalter unit where the application of an electric field causes water droplets to coalesce. Large electrocoalesced water droplets settle under gravity and separate from the desalted oil. Electrocoalescence (i.e. coalescence under electric field) is also used to dehydrate crude at or near production sites to remove water before sending to the refinery. However, it is not uncommon for refineries to operate without desalters, and thus permit particulates in the crude hydrocarbons to flow through downstream components.

Figure 10:
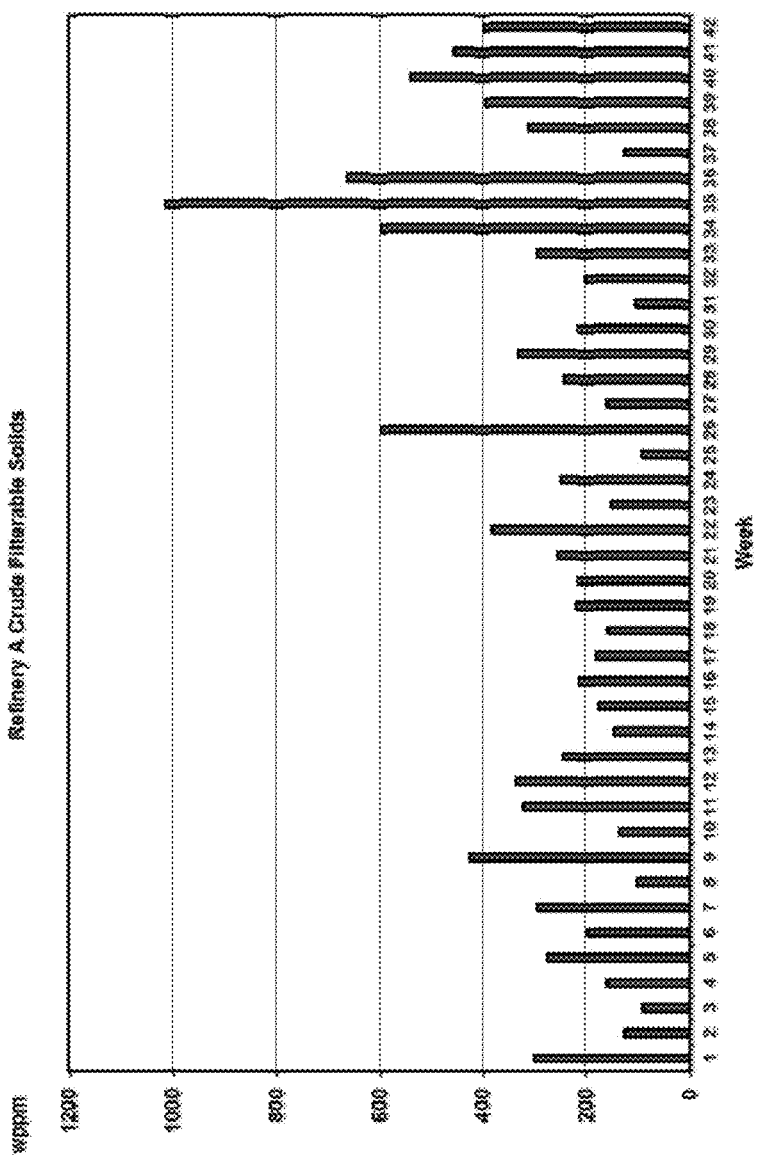
FIG. 10 is a graph of crude blend filterable solids levels measured in a representative refinery refining a non-HSDP hydrocarbon stream with filterable solids greater than 100 wppm and that operates with an expected low flow velocity.

In view of the above, field observation of three separate refineries (Refineries A, B, and C) was conducted over the course of up to 8 months. Refinery A ran hydrocarbon streams through the shell side of shell-and-tube heat exchangers, and consequently operated with an expected flow velocity less than 3 feet/second during normal operating conditions. Furthermore, the hydrocarbon streams of Refinery A contained greater than 100 wppm of filterable solids without use of a desalter. FIG. 10 illustrates the levels of filterable solids observed weekly over 8 months in Refinery A.

Figure 11:
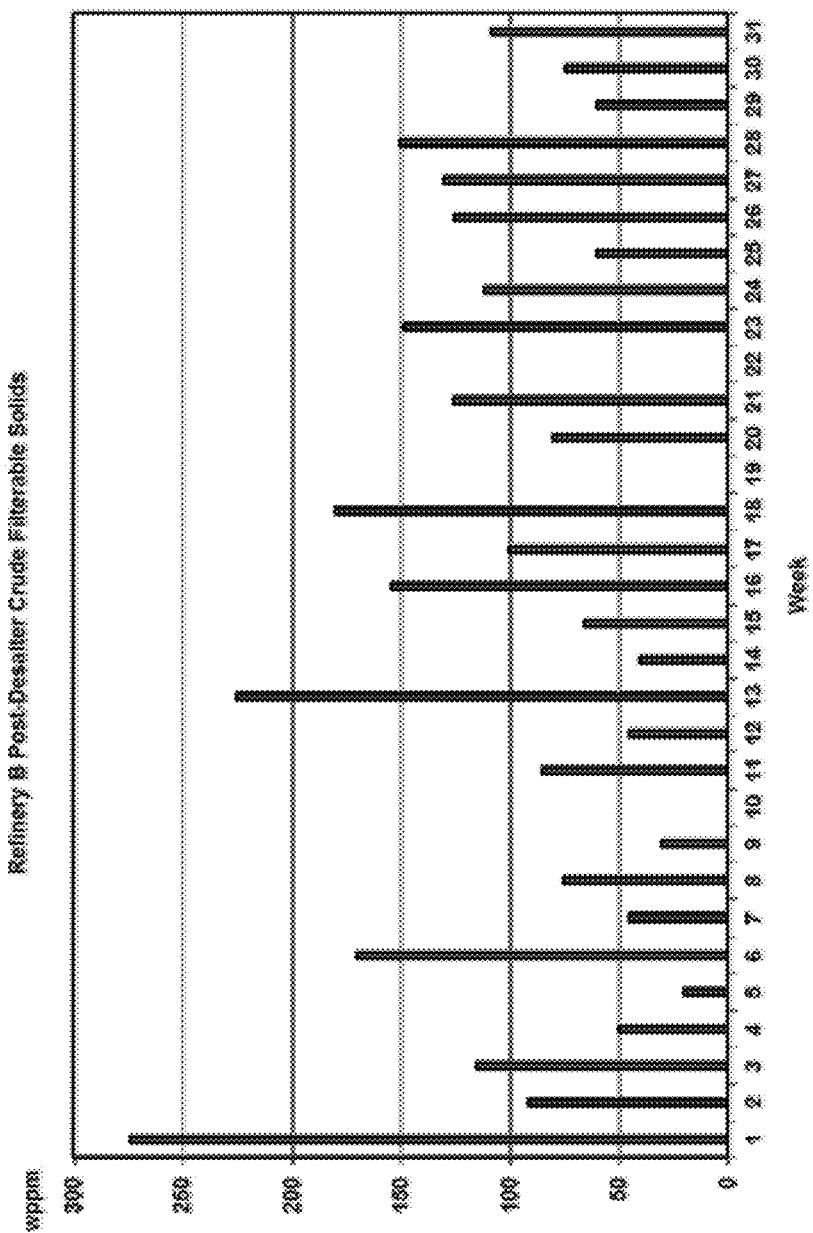
FIG. 11 is a graph of crude blend filterable solids levels measured in a representative refinery refining a non-HSDP hydrocarbon stream with filterable solids greater than 100 wppm.
Figure 12:
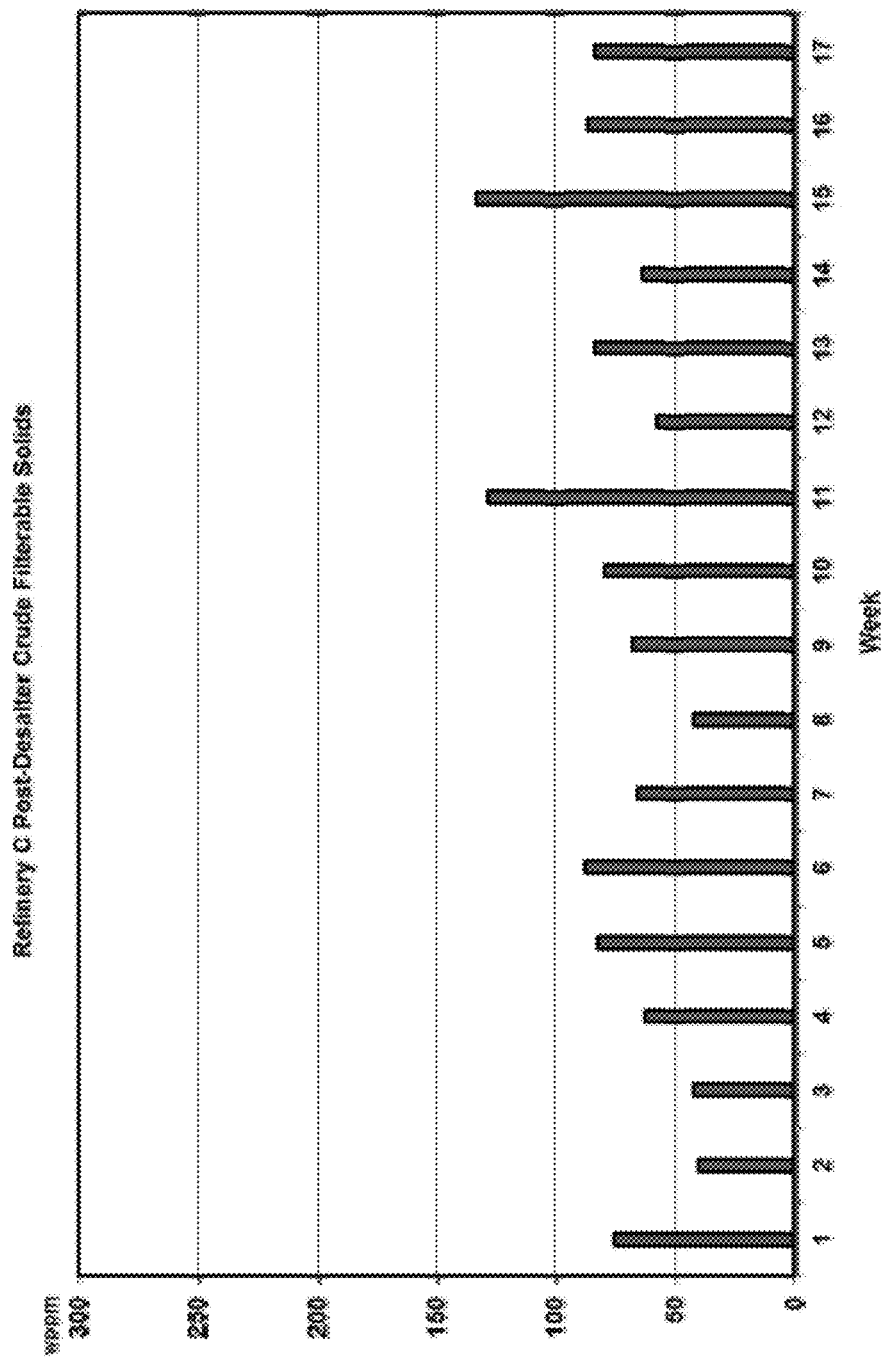
FIG. 12 is a graph of crude blend filterable solids levels measured in a representative refinery refining a non-HSDP hydrocarbon stream with filterable solids below 100 wppm.

Refinery B included a desalter, but the hydrocarbon streams had post-desalter filterable solids levels greater than 100 wppm. By contrast, Refinery C processed hydrocarbon streams typically containing less than 100 wppm filterable solids. FIG. 11 and FIG. 12 illustrate the filterable solids levels in wppm measured weekly in crude blend samples taken over 4- and 6-month periods from Refinery B and Refinery C, respectively.

Figure 13:
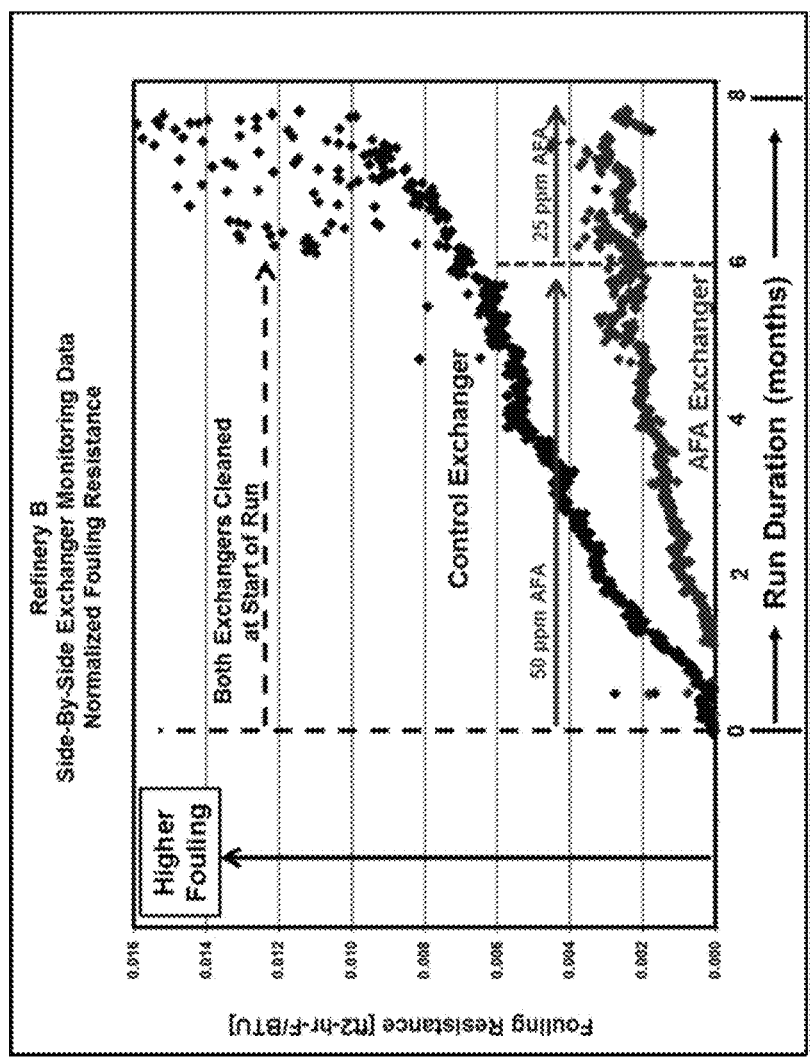
FIG. 13 is a graph illustrating fouling resistance values observed with and without anti-fouling additive use over the course of an 8-month refinery run from side-by-side exchanger monitoring in a refinery refining a non-HSDP hydrocarbon stream with filterable solids greater than 100 wppm.
Figure 14:
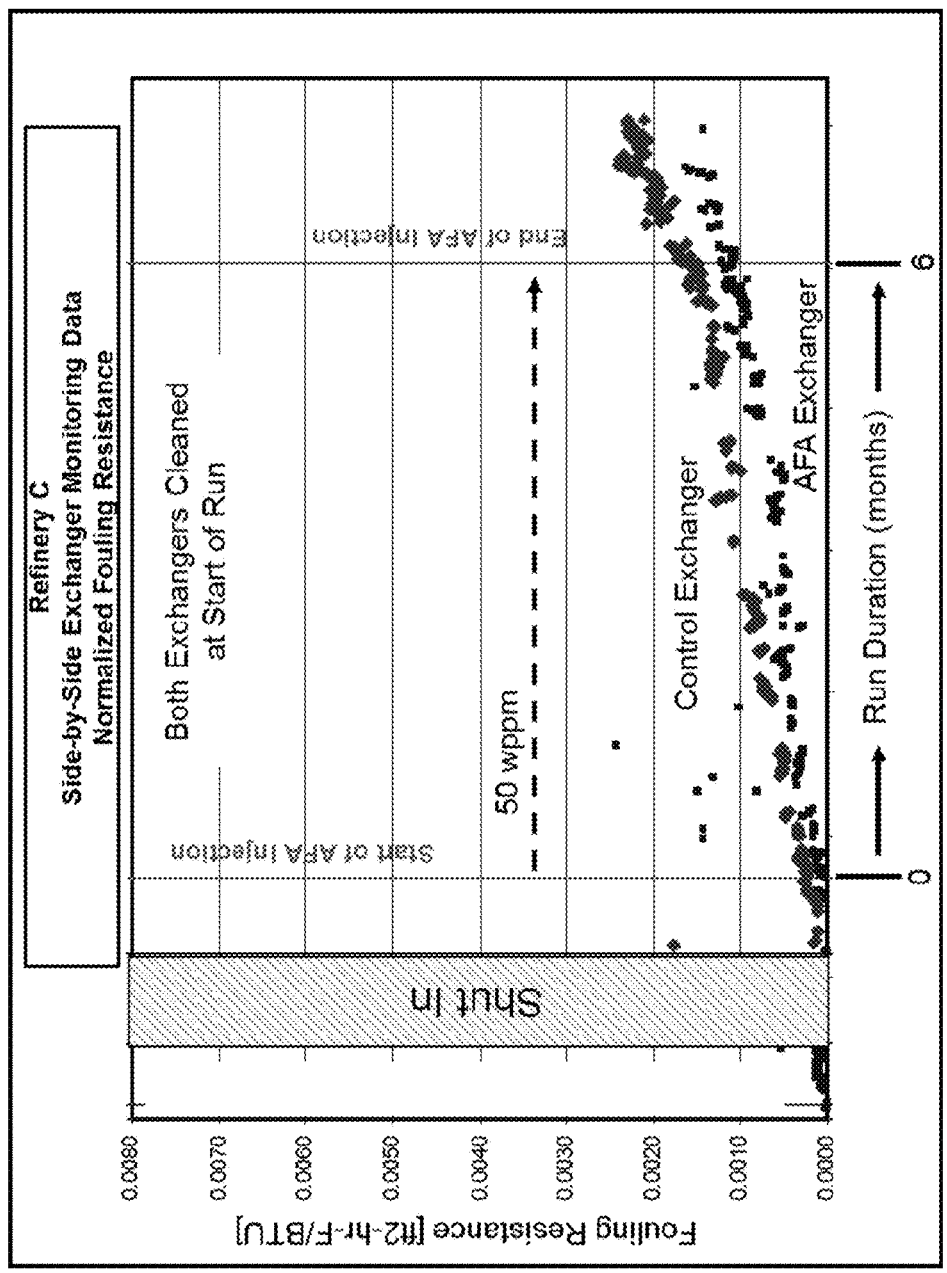
FIG. 14 is a graph illustrating fouling resistance values observed with and without anti-fouling additive use over the course of a 6-month refinery run from side-by-side exchanger monitoring in a refinery refining a non-HSDP hydrocarbon stream with filterable solids less than 100 wppm.

Significant fouling was observed in Refinery A. Significant fouling was also observed in Refinery B, while minimal fouling was observed in Refinery C. FIG. 13 and FIG. 14 illustrate fouling resistance (in ft2*hour*degree Farenheit per BTU), a measure of the insulating effect of foulant material on the heat transfer surface in heat exchangers, observed at Refinery B and Refinery C of the course of an eight-month run and a six-month run, respectively. Notably, and as illustrated in FIGS. 13 and 14, in side-by-side comparison of heat exchangers refining hydrocarbon streams treated with 50 wppm antifoulant additive ("AFA") and 25 wppm AFA, fouling resistance was markedly decreased by AFA in Refinery B but not Refinery C.

As such, and as evident from the investigation, a need for introducing antifouling additives was identified for refineries having low flow velocity conditions, particularly through a heat exchanger, and/or hydrocarbon streams with a crude filterable solids level above 100 wppm, whereas no antifoulant need was identified for a refinery without such conditions. Furthermore, it is noted that the investigation established each condition can be mutually exclusive, and thus it is not necessary to perform both determining whether the hydrocarbon stream is subject to filterable solids levels greater than about 100 wppm and classifying whether the hydrocarbon stream has an expected low flow velocity during normal operating conditions within the refinery where one such parameter is established.

Another important consideration regarding the necessity of antifouling additives in a hydrocarbon stream is the composition of the hydrocarbon stream itself. As disclosed in U.S. Pat. Nos. 7,833,407, 7,837,855, 7901,564, 7,919,058, 7,951,349, 8,062,504, 8,425,761, and 8,440,069, hereby incorporated herein by reference in their entireties, so-called high solvency dispersive power (HSDP) crude has been determined to be highly resistant to induction of fouling, irrespective of the concentration of filterable solids in the crude and irrespective of the flow velocity of the crude through the pre-heat train. HSDP crude is characterized by a solubility blending number ($S_{BN}$) greater than 90 and a total acid number (TAN) greater than 0.3. $S_{BN}$ is a parameter relating to the compatibility of an oil with different proportions of a model solvent mixture, such as toluene/n-heptane. A high $S_{BN}$ indicates high solubility of asphaltenes and particulates in the hydrocarbon stream. TAN is an index of and is measured in units of mg KOH/gram crude. TAN is understood to indicate the presence of molecules, and in particular, naphthenic acids, that disperse particulates in the hydrocarbon stream to prevent the particulates from adhering to heated surfaces of the crude pre-heat train. The determination of $S_{BN}$ and TAN for a hydrocarbon stream is well recognized in the art. U.S. Pat. No. 5,871,634 to Wiehe et al discloses the determination of SBn. TAN is measured by ASTM Test D664-11.

Accordingly, in another aspect of the present disclosure, a method of predicting a need for introducing anti-fouling additives to a hydrocarbon stream in a hydrocarbon refinery can further include characterizing whether the hydrocarbon stream is HSDP crude or non-HSDP crude. Indeed, characterizing whether the hydrocarbon stream is a HSDP crude or a non-HSDP crude can be performed initially according to the disclosed method, such that determining and classifying need not be performed if the hydrocarbon stream is characterized as a HSDP crude.

In certain embodiments, characterizing whether the hydrocarbon stream is a non-HSDP crude includes measuring the SBN and TAN of the hydrocarbon stream and determining whether the SBN of the hydrocarbon stream if below 90 or if the TAN is below 0.3 mg KOH/g, using such techniques as known in the art.

In accordance with the disclosed subject matter, the method can comprise predicting a need for fouling mitigation based on multiple parameters. For example, the method comprises characterizing whether the hydrocarbon stream is a non-HSDP crude, and both determining whether the hydrocarbon stream is subject to filterable solids levels greater than about 100 wppm, and classifying the hydrocarbon stream as having an expected low flow condition within a heat exchanger of the refinery. In additional embodiments, the method comprises both characterizing whether the hydrocarbon stream is non-HSDP crude, and determining whether the hydrocarbon stream is subject to filterable solids levels greater than about 100 wppm without classifying low flow conditions. In still further embodiments, the method comprises both characterizing whether the hydrocarbon stream is HSDP crude or non-HSDP crude, and classifying whether the hydrocarbon stream has an expected low flow condition during normal operating conditions within a heat exchanger of the refinery without determining whether the hydrocarbon stream is subject to filterable solids levels greater than 100 wppm.

In view of the above, and particularly based upon the results of the prediction, the method can further comprise adding one or more of the additives disclosed herein, or otherwise incorporated by reference herein. For example, and not limitation, the method can include adding one or more of Formula A and Formula B above. Additional suitable additives are disclosed in U.S. Patent Publication Nos. 20100170829, 2012-0245298, 2012-0245310, and 2013-0245299 and are hereby incorporated by reference herein in their entireties. In additional embodiments of the disclosed subject matter, a method of predicting a need for fouling mitigation in a crude oil refinery is provided. In some embodiments, the method comprises selecting a crude oil refinery, and determining if the crude oil refinery runs crude oils through a shell side of a shell-and-tube heat exchanger, operates without a desalter, or processes crude blends with post-desalter crude filterable solids levels greater than about 100 wppm, wherein refinery operation according to one or more of these parameters indicates a need for fouling mitigation.

For example, it has been determined that the antifoulant additives according to Formula A and/or Formula B can be added to the hydrocarbon stream at a concentration as high as about 1000 wppm with beneficial results. In additional embodiments, such antifoulant additives can be provided at a concentration of about 10 wppm to about 100 wppm. In still further embodiments, the antifoulant additives can be provided at a concentration of about 18 wppm, or about 35 wppm, to about 50 wppm.

Polyalkyl succinic anhydride derivatives such as those disclosed herein are effective in mitigating fouling observed in refineries operating according to the parameters discussed above. Accordingly, in some embodiments of the methods disclosed herein, polyalkyl succinic anhydride derivatives are added to the hydrocarbon stream during refinement to mitigate fouling. In some embodiments, where more than one antifoulant additive is added, at least one of the antifoulant additives added to the hydrocarbon is a polyalkyl succinic anhydride derivative. Suitable polyalkylsuccinic anhydride derivatives include, without limitation, those disclosed in U.S. Patent Publication Nos. 20100170829, 2012-0245298, 2012-0245310, and 2013-0245299, incorporated herein by reference above. In some embodiments, antifoulant additives can be added to the hydrocarbon stream at a concentration as high as about 1000 wppm. In additional embodiments, and more commonly, the antifoulant additive is provided at a concentration of about 10 wppm to about 100 wppm. In still further embodiments, the antifoulant additive is provided at a concentration of about 18 wppm, or about 35 wppm, to about 50 wppm.

The method as disclosed herein is applicable to any suitable hydrocarbon stream and refinery system. For example, the hydrocarbon stream can be a whole crude oil. In alternative embodiments, the hydrocarbon stream is a crude oil fraction, a blend of two or more crude oils, or a blend of fractions thereof. The crude oil refinery can include, but not be limited to a heat exchanger, furnace, distillation column, scrubber, reactor, liquid-jacketed tank, pipestill, coker, or visbreaker.

In certain embodiments, one or more of characterizing whether the hydrocarbon stream is non-HSDP crude, determining whether the hydrocarbon stream contains filterable solids levels greater than about 100 wppm, and/or classifying whether the hydrocarbon stream has an expected low flow velocity during normal operating conditions of the refinery is performed by sampling the composition and/or the velocity of the hydrocarbon stream. Sampling can be performed periodically, continuously, or substantially continuously. Likewise, sampling can be performed automatically or manually.

Sampling of the hydrocarbon stream can be performed at a variety of locations in the refinery system, such as upstream of the crude pre-heat train, or at one or more points in the crude pre-heat train immediately upstream of a heat exchanger. In certain embodiments, sampling occurs downstream of the desalter. In alternative embodiments, or if no desalter is employed, sampling can occur upstream of one or more heat exchangers.

In accordance with another aspect of the disclosed subject matter, a system is provided for predicting a need for introducing antifouling additives to a hydrocarbon stream in a hydrocarbon refinery. The system comprises a processor to receive a characterization of whether the hydrocarbon stream is a non-HSDP crude, and at least one of (a) a determination whether the hydrocarbon stream is subject to (i.e., contains or temporarily contains) filterable solids levels greater than about 100 wppm, or (b) a classification whether the hydrocarbon stream has an expected low flow velocity within the refinery during normal operating conditions. The processor is configured to indicate that anti-fouling additives are recommended if the characterization is that the hydrocarbon stream is a non-HSDP crude and either the determination is that the hydrocarbon stream is subject to filterable solids levels greater than about 100 wppm or the classification is that the hydrocarbon stream has an expected low flow within the refinery. For example, and not limitation, the processor can receive the results of such sampling described above. The processor is configured to indicate a need based on the determination and at least one of the characterization or the classification. For example, and as described in detail above, the processor can rely upon both a determination that the hydrocarbon stream is subject to filterable solids levels greater than about 100 wppm, and classification of the hydrocarbon stream as having an expected low flow condition within the refinery. Alternatively, the processor can rely on a determination that the hydrocarbon stream is subject to filterable solids levels greater than about 100 wppm, or a classification of the hydrocarbon stream as having an expected low flow condition within the refinery. The processor can indicate a need for antifouling additives by any suitable output mechanism, including displaying a message informing an operator that addition of anti-fouling additives is indicated. Additionally or alternatively, the processor can automatically adjust or add such antifouling additive to the refinery based upon the indication.

Uses of the Additives and Compositions for Antifouling Applications

The additives of the disclosed subject matter are generally soluble in a typical hydrocarbon refinery stream and can thus be added directly to the process stream, alone or in combination with other additives that either reduce fouling or improve some other process parameter.

The additives can be introduced, for example, upstream from the particular crude hydrocarbon refinery component(s) (e.g., a heat exchanger) in which it is desired to prevent fouling (e.g. particulate-induced fouling). Alternatively, the additive can be added to the crude oil prior to being introduced to the refining process, or at the very beginning of the refining process.

It is noted that water can have a negative impact on boron-containing additives. Accordingly, it is advisable to add boron-containing additives at process locations that have a minimal amount of water.

While not limited thereto, the additives of the disclosed subject matter are particularly suitable in reducing or preventing particulate-induced fouling. Thus one aspect of the disclosed subject matter provides a method of reducing and/or preventing, in particular, particulate-induced fouling that includes adding at least one additive of the disclosed subject matter to a process stream that is known, or believed to contribute to, particulate-induced fouling. To facilitate determination of proper injection points, measurements can be taken to ascertain the particulate level in the process stream. Thus, one embodiment of the disclosed subject matter includes identifying particular areas of a refining process that have relatively high particulate levels, and adding any one of the additives of the disclosed subject matter in close proximity to these areas (e.g., just upstream to the area identified as having high particulate levels).

In some embodiments of the disclosed subject matter, a method to reduce fouling is provided comprising adding any one of the above-mentioned additives or compositions to a crude hydrocarbon refinery component that is in fluid communication with a process stream that contains, at least 50 wppm of particulates, including organic and inorganic particulates. In another embodiment of the disclosed subject matter, a method to reduce fouling is provided comprising adding any one of the above-mentioned antifouling additives or compositions to a crude hydrocarbon refinery component that is in fluid communication with a process stream. In another embodiment of the disclosed subject matter, a method to reduce fouling is provided comprising adding any one of the above-mentioned additives to a crude hydrocarbon refinery component that is in fluid communication with a process stream that contains at least 250 wppm (or 1000 wppm, or 10,000 wppm) of particulates, including organic and inorganic particulates, as defined above.

In some embodiments of the disclosed subject matter, the additives or compositions of the disclosed subject matter are added to selected crude oil process streams known to contain, or possibly contain, problematic amounts of organic or inorganic particulate matter (e.g. 1-10,000 wppm), such as inorganic salts. Accordingly, the additives of the disclosed subject matter can be introduced far upstream, where the stream is relatively unrefined (e.g. the refinery crude pre-heat train). The additives can be also added, for example, after the desalter to counteract the effects of incomplete salt removal or to the bottoms exit stream from the fractionation column to counteract the high temperatures that are conducive to fouling.

FIG. 1 demonstrates possible additive injection points within the refinery crude pre-heat train for the additives of the disclosed subject matter, wherein the numbered circles represent heat exchangers. As shown in FIG. 1, the additives can be introduced in crude storage tanks and at several locations in the preheat train. This includes at the crude charge pump (at the very beginning of the crude pre-heat train), and/or before and after the desalter, and/or to the bottoms stream from a flash drum.

The total amount of additive to be added to the process stream can be determined by a person of ordinary skill in the art. In one embodiment, up to about 1000 wppm of additive is added to the process stream. For example, the additive can be added such that its concentration, upon addition, is about 50 ppm, 250 ppm or 500 ppm. More or less additive can be added depending on, for example, the amount of particulate in the stream, the $\Delta T$ associated with the particular process and the degree of fouling reduction desired in view of the cost of the additive.

The additives or compositions of the disclosed subject matter can be added in a solid (e.g. powder or granules) or liquid form directly to the process stream. As mentioned above, the additives or compositions can be added alone, or combined with other components to form a composition for reducing fouling (e.g. particulate-induced fouling). Any suitable technique can be used for adding the additive to the process stream, as known by a person of ordinary skill in the art in view of the process to which it is employed. As a non-limiting example, the additives or compositions can be introduced via injection that allows for sufficient mixing of the additive and the process stream.

Example 1

Synthesis of Compounds

Various examples of using the methods of compound synthesis described above are provided herein. Polyisobutylene succinimide dispersants were obtained from commercial suppliers (Infineum, Lubrizol, Chevron Oronite, Afton Chemical, BASF, etc). Alternatively, polyisobutylene-based polyamine succinimide dispersants were prepared by using commercially available highly reactive polyisobutylenes (HR-PIB) from BASF and from Texas Petrochemcials (TPC) as exemplified below.

Example 1A

Maleation of Vinylidene-Terminated Polyisobutylene (PIB) with Maleic Anhydride

To a 300 ml stainless steel autoclave equipped with a mechanical stirrer and $N_2$ inlet and a $N_2$ outlet was added highly reactive polyisobutylene (BASF Glissopal 2300, 85 g)

followed by maleic anhydride (15.65 g) at room temperature. The mixture was stirred and flushed three times with nitrogen at room temperature and pressurized to 80 psi. The mixture was heated to 250° C. for 2 hours and allowed to cool to room temperature. The pressure was released slowly and the autoclave was opened. The mixture was diluted with hexanes, filtered under house vacuum and the filtrate was concentrated on a rotary evaporator. The mixture was heated at 95° C. under high vacuum to afford a viscous light brown oily product (90.66 g). Elemental analyses for this PIB-SA material found C, 82.44%, H, 13.25%.

Example 1B

Maleation of Vinyl-Terminated Polypropylene (vt-PP) with Maleic Anhydride

A mixture of vinyl-terminated polypropylene ($^1$H NMR MW 1210 g/mol, 44.00 g) and maleic anhydride (10.70 g) was heated at 205° C. for 24 hours under a nitrogen atmosphere. The mixture was cooled to room temperature, diluted with hexanes, filtered and concentrated on a rotary evaporator. Excess maleic anhydride was removed by heating under high vacuum to afford a viscous brown oily product (46.59 g). Elemental analyses for this PP-SA material found C, 81.27%, H, 13.19%.

Example 1C

Maleation of Vinyl-Terminated Propylene/1-Hexene Copolymer with Maleic Anhydride A mixture of vinyl-terminated polypropylene ($^1$H NMR MW 1638 g/mol, 48.60 g) and maleic anhydride (11.64 g) was heated at 190° C. for 42 hours under a nitrogen atmosphere. The mixture was cooled to room temperature, diluted with hexanes, filtered and concentrated on a rotary evaporator. Excess maleic anhydride was removed by heating under high vacuum to afford a viscous brown oily product (53.10 g). Elemental analyses for this $C_3C_6$-SA material found C, 82.33%, H, 13.26%.

Example 1D

Condensation of Polyisobutylene Succinic Anhydride (PIB-SA) with Tetraethylenepentamine (TEPA)

A mixture of polyisobutylene succinic anhydride (25.00 g) and xylenes (100 ml) was stirred at room temperature under a nitrogen atmosphere and a solution of tetraethylenepentamine (2.36 g, 12.47 mmol) in xylenes (15 ml) was slowly added. The resulting mixture was heated in an oil bath at 165° C. for 15.5 hours. The brown mixture was cooled to room temperature and excess xylenes removed on a rotary evaporator. The residual liquid product was further purified by heating under high vacuum to afford a viscous brown oily product (26.91 g). Elemental analyses for this PIB-SA-TEPA compound found C, 81.32%, H, 13.25%, N, 3.05%.

Example 1E

Condensation of Polypropylene Succinic Anhydride (PP-SA) with Tetraethylenepentamine (TEPA)

A mixture of polypropylene succinic anhydride (18.00 g) and xylenes (50 ml) was stirred at room temperature under a nitrogen atmosphere and a solution of tetraethylenepentamine (3.15 g, 16.6 mmol) in xylenes (10 ml) was slowly added. The resulting mixture was heated in an oil bath at 175° C. for 24 hours. The brown mixture was cooled to room temperature and excess xylenes removed on a rotary evaporator. The residual liquid product was further purified by heating under high vacuum to afford a viscous brown oily product (20.52 g). Elemental analyses for this PP-SA-TEPA material found C, 78.30%, H, 12.97%, N, 5.11%.

Example 1F

Condensation of Propylene/1-Hexene Succinic Anhydride ($C_3C_6$-SA) with Tetraethylenepentamine (TEPA)

A mixture of propylene/1-hexene succinic anhydride (25.70 g) and xylenes (60 ml) was stirred at room temperature under a nitrogen atmosphere and a solution of tetraethylenepentamine (2.55 g, 13.5 mmol) in xylenes (15 ml) was slowly added. The resulting mixture was heated in an oil bath at 170° C. for 24 hours. The brown mixture was cooled to room temperature and excess xylenes removed on a rotary evaporator. The residual liquid product was further purified by heating under high vacuum to afford a viscous brown oily product (27.58 g). Elemental analyses for this $C_3C_6$-SA-TEPA material found C, 81.38%, H: 12.74%, N, 3.30%.

Example 1G

Maleation of Vinyl-Terminated Atactic Polypropylene

To a two-neck 500 ml round-bottomed flask equipped with a $N_2$ inlet and a $N_2$ outlet was added vinyl-terminated atactic polypropylene (GPC $M_w$ 5646, $M_n$ 1474, $^1$H NMR MW 1190.19 g/mol, 75.00 g, 63.02 mmol) followed by maleic anhydride (15.45 g, 157.56 mmol) at room temperature. The mixture was flushed with nitrogen for 10 min at room temperature and the mixture was heated to 190° C. (oil bath) for 63.5 hours under a nitrogen atmosphere. Additional maleic anhydride (3.10 g, 31.61 mmol) was added to the mixture that had been cooled to about 120° C. and heating was continued at 190° C. (oil bath) for an additional 17 hours under a nitrogen atmosphere. The mixture was cooled to room temperature, diluted with hexanes, filtered and concentrated on a rotary evaporator. Excess maleic anhydride was removed by heating at 95-100° C. under high vacuum to afford a light brown viscous oily product (85.70 g). GPC $M_w$ 4020, $M_n$ 1413. Elemental analyses for this polypropylene succinic anhydride found C, 80.79%, H, 12.51%. The oxygen content of this material is estimated to be about 6.70 wt % by difference. The anhydride content of this polymer material is estimated to be about 1.396 mmol/g. Based on the molecular weight of polymer starting material, there is an average of 1.93 succinic anhydride functionality per polymer chain.

Example 1H

Maleation of Vinyl-Terminated Atactic Polypropylene

To a 300 ml stainless steel autoclave equipped with a mechanical stirrer and a $N_2$ inlet and a $N_2$ outlet was added vinyl-terminated atactic polypropylene (GPC $M_w$ 2387, $M_n$ 1069, $^1$H NMR MW 1015.76 g/mol, 90 g, 88.60 mmol) followed by maleic anhydride (34.75 g, 354.37 mmol) at room temperature. The mixture was stirred and flushed three times with nitrogen at room temperature and pressurized to about 250 psi with nitrogen. The mixture was heated to 250° C. for 3 hours at about 400 psi and allowed to cool to room temperature. The pressure was released slowly and the autoclave was opened. The mixture was diluted with hexanes, filtered under house vacuum and the filtrate was concentrated on a rotary evaporator. Excess maleic anhydride was removed by heating at 95° C. under high vacuum to afford a light brown viscous oily product (100.92 g). GPC $M_w$ 2527, $M_n$ 1112. Elemental analyses for this polypropylene succinic anhydride found C, 77.92%, H, 11.77%. The oxygen content of this material is estimated to be about 10.31 wt % by difference. The anhydride content of this copolymer material is estimated to be about 2.148 mmol/g. Based on the molecular weight of polymer starting material, there is an average of about 2.76 succinic anhydride functionality per polymer chain.

Example 1J

Maleation of Vinyl-Terminated Propylene/1-Hexene Copolymer

To a two-neck 500 ml round-bottomed flask equipped with a $N_2$ inlet and a $N_2$ outlet was added vinyl-terminated propylene/1-hexene copolymer (GPC $M_w$ 1259, $M_n$ 889, $^1$H NMR MW 846.53 g/mol, 150 g, 177.19 mmol) followed by maleic anhydride (43.44 g, 442.99 mmol) at room temperature. The mixture was flushed with nitrogen for 10 min at room temperature and the mixture was heated to 190° C. (oil bath) for 38.5 hours under a nitrogen atmosphere. The mixture was cooled to room temperature, diluted with hexanes, filtered and concentrated on a rotary evaporator. Excess maleic anhydride was removed by heating at 95-100° C. under high vacuum to afford a light brown viscous oily product (178.94 g). GPC $M_w$ 1587, $M_n$ 1023. Elemental analyses for this propylene/1-hexene succinic anhydride copolymer found C, 80.01%, H, 12.15%. The oxygen content of this material is estimated to be about 7.84 wt % by difference. The anhydride content of this copolymer material is estimated to be about 1.633 mmol/g. Based on the molecular weight of polymer starting material, there is an average of about 1.65 succinic anhydride functionality per polymer chain.

Example 1K

Maleation of Vinyl-Terminated Propylene/1-Hexene Copolymer

To a 300 ml stainless steel autoclave equipped with a mechanical stirrer and a $N_2$ inlet and a $N_2$ outlet was added vinyl-terminated propylene/1-hexene copolymer (GPC $M_w$ 1894, $M_n$ 997, $^1$H NMR MW 1012.79 g/mol, 90 g, 88.86 mmol) followed by maleic anhydride (20.91 g, 213.24 mmol) at room temperature. The mixture was stirred and flushed three times with nitrogen at room temperature and pressurized to about 80 psi with nitrogen. The mixture was heated to 250° C. for 3 hours at about 140 psi and allowed to cool to room temperature. The pressure was released slowly and the autoclave was opened. The mixture was diluted with hexanes, filtered under house vacuum and the filtrate was concentrated on a rotary evaporator. Excess maleic anhydride was removed by heating at 95° C. under high vacuum to afford a light brown viscous oily product (103.54 g). GPC $M_w$ 1937, $M_n$ 1058. Elemental analyses for this propylene/1-hexene succinic anhydride copolymer found C, 80.79%, H, 12.61%. The oxygen content of this material is estimated to be about 6.60 wt % by difference. The anhydride content of this copolymer material is estimated to be about 1.375 mmol/g. Based on the molecular weight of polymer starting material, there is an average of about 1.61 succinic anhydride functionality per polymer chain.

Example 1L

Maleation of Vinyl-Terminated Propylene/1-Butene Copolymer

To a two-neck 250 ml round-bottomed flask equipped with a $N_2$ inlet and a $N_2$ outlet was added vinyl-terminated propylene/1-butene copolymer (GPC $M_w$ 2197, $M_n$ 1030, $^1$H NMR MW 1062.16 g/mol, 50 g, 47.07 mmol) followed by maleic anhydride (9.23 g, 94.13 mmol) at room temperature. The mixture was flushed with nitrogen for 10 min at room temperature and the mixture was heated to 190° C. (oil bath) for 84.5 hours under a nitrogen atmosphere. The mixture was cooled to room temperature, diluted with hexanes, filtered and concentrated on a rotary evaporator. Excess maleic anhydride was removed by heating at 95-100° C. under high vacuum to afford a light brown viscous oily product (54.97 g). The molecular weight of the product, $M_w$ 2294, $M_n$ 1242, determined by GPC. Elemental analyses for this propylene/1-butene succinic anhydride copolymer found C, 81.76%, H, 13.09%. The oxygen content of this material is estimated to be about 5.15 wt % by difference. The anhydride content of this copolymer material is estimated to be about 1.073 mmol/g. Based on the molecular weight of polymer starting material, there is an average of about 1.27 succinic anhydride functionality per polymer chain.

Example 1M

Condensation of Polypropylene Succinic Anhydride with Tetraethylenepentamine (TEPA)

A mixture of polypropylene succinic anhydride (28.00 g, from Example 1G, 39.09 mmol anhydride) and xylenes (85 ml) was stirred at room temperature under a nitrogen atmosphere and a solution of tetraethylenepentamine (4.11 g, 21.71 mmol) in xylenes (15 ml) was slowly added. The resulting mixture was heated in an oil bath at 170° C. for 24 hours under a nitrogen atmosphere and an azeotropic mixture of xylenes and water was collected in a Dean-Stark trap. The light brown mixture was cooled to room temperature and excess xylenes removed on a rotary evaporator. The residual liquid product was further purified by heating at 95° C. under high vacuum to afford a dark brown viscous product (28.21 g), whose $M_w$ was determined to be 4738 by GPC. Elemental analyses for this PP-SA-TEPA material found C, 79.04%, H, 12.46%, N, 5.07%.

Example 1N

Condensation of Propylene/1-Hexene Succinic Anhydride ($C_3C_6$-SA) with Tetraethylenepentamine (TEPA)

A mixture of propylene/1-hexene succinic anhydride (30.00 g, from Example 1J, 48.99 mmol anhydride) and xylenes (85 ml) was stirred at room temperature under a nitrogen atmosphere and a solution of tetraethylenepentamine (4.22 g, 22.29 mmol) in xylenes (15 ml) was slowly added. The resulting mixture was heated in an oil bath at 165° C. for 24 hours under a nitrogen atmosphere and an azeotropic mixture of xylenes and water was collected in a Dean-Stark trap. The light brown mixture was cooled to room temperature and excess xylenes removed on a rotary evaporator. The residual liquid product was further purified by heating at 95° C. under high vacuum to afford a brown viscous product (33.24 g), whose molecular weight $M_w$ was determined to be 4684 by GPC. Elemental analyses for this $C_3C_6$-SA-TEPA material found C, 77.96%, H, 12.11%, N, 4.46%.

Example 1P

Condensation of Propylene/1-Butene Succinic Anhydride ($C_3C_4$-SA) with Tetraethylenepentamine (TEPA)

A mixture of propylene/1-butene succinic anhydride (25.00 g, from Example 1K, 26.83 mmol anhydride) and xylenes (85 ml) was stirred at room temperature under a nitrogen atmosphere and a solution of tetraethylenepentamine (3.38 g, 17.86 mmol) in xylenes (15 ml) was slowly added. The resulting mixture was heated in an oil bath at 165° C. for 24 hours under a nitrogen atmosphere and an azeotropic mixture of xylenes and water was collected in a Dean-Stark trap. The light brown mixture was cooled to room temperature and excess xylenes removed on a rotary evaporator. The residual liquid product was further purified by heating at 95° C. under high vacuum to afford a dark brown viscous product (27.57 g), whose molecular weight $M_w$ was determined to be 3878 by GPC. Elemental analyses for this $C_3C_4$-SA-TEPA material found C, 79.71%, H, 13.04%, N, 4.31%.

Example 1Q

Copolymerization of Vinyl-Terminated Atactic Polypropylene with Maleic Anhydride A mixture of vinyl-terminated atactic polypropylene (NB#25136-002-001, GPC $M_w$ 2301, $M_n$ 1180, $^1$H NMR MW 944.7 g/mol, 15.00 g, 15.88 mmol), maleic anhydride (2.49 g, 25.39 mmol) and xylenes (14 ml) was heated to 150° C. (oil bath temperature) under a nitrogen atmosphere. A solution of di-tert-butyl peroxide (0.244 g, 1.67 mmol) in xylenes (5 ml) was added slowly to the mixture over 1 hour while the oil bath was maintained at 150° C. After complete addition of the peroxide solution, the mixture was heated at 155° C. for 4.5 hours and then at 160° C. for 1 hour under a nitrogen atmosphere. The mixture was cooled to room temperature and excess solvent and volatile material were removed on a rotary evaporator. The crude product was further purified by heating at 95° C. under high vacuum to afford a light yellow viscous material (17.26 g). The conversion of polypropylene starting material was about 81% according to $^1$H NMR spectroscopy. The molecular weight of the material was determined to be $M_w$ 4247, $M_n$ 1977 (by GPC). Elemental analyses for this PP-MA copolymer material found C, 81.01%, H, 12.56%. The oxygen content of this material is estimated to be about 6.43 wt % by difference.

Example 1R

Copolymerization of Vinyl-Terminated Atactic Polypropylene with Maleic Anhydride A mixture of vinyl-terminated atactic polypropylene (GPC $M_w$ 4453, $M_n$ 2087, $^1$H NMR MW 1751.5 g/mol, 30.00 g, 17.13 mmol), maleic anhydride (2.69 g, 27.43 mmol) and xylenes (17 ml) was heated to 148° C. (oil bath temperature) under a nitrogen atmosphere. A solution of di-tert-butyl peroxide (0.426 g, 2.91 mmol) in xylenes (5 ml) was added slowly to the mixture over 2 hours while the oil bath was maintained at 148° C. After complete addition of the peroxide solution, the mixture was heated at 148° C. for 4.5 hours under a nitrogen atmosphere. Additional di-tert-butyl peroxide (0.15 g, 1.03 mmol) in xylenes (5 ml) was added to the mixture and heating was continued at 148° C. for an additional 4.5 hours. A further additional amount of di-tert-butyl peroxide (0.15 g, 1.03 mmol) in xylenes (5 ml) was added to the mixture and heating was continued at 148° C. for an additional 3.5 hours. The mixture was cooled to room temperature and excess solvent and volatile material were removed on a rotary evaporator. The crude product was further purified by heating at 95° C. under high vacuum to afford a colorless viscous material (33.10 g). The conversion of polypropylene starting material was about 83% according to $^1$H NMR spectroscopy. The molecular weight of the material was determined as $M_w$ 6552, $M_n$ 2539 (by GPC). Elemental analyses for this PP-MA copolymer material found C, 82.89%, H, 13.10%. The oxygen content of this material is estimated to be about 4.01 wt % by difference.

Example 1S

Copolymerization of Vinyl-Terminated Propylene/1-Hexene Copolymer with Maleic Anhydride A mixture of vinyl-terminated propylene/1-hexene copolymer (GPC $M_w$ 3157, $M_n$ 1453, $^1$H NMR MW 1567.2 g/mol, 30.00 g, 19.14 mmol), maleic anhydride (3.75 g, 38.24 mmol) and xylenes (18 ml) was heated to 163° C. (oil bath temperature) under a nitrogen atmosphere. A solution of di-tert-butyl peroxide (0.560 g, 3.83 mmol) in xylenes (8 ml) was added slowly to the mixture over 80 minutes while the oil bath was maintained at 163° C. After complete addition of the peroxide solution, the mixture was heated at 163° C. for 15.5 hours under a nitrogen atmosphere. The mixture was cooled to room temperature and excess solvent and volatile material were removed on a rotary evaporator. The crude product was further purified by heating at 95° C. under high vacuum to afford a light yellow viscous material (34.22 g). The conversion of propylene/1-hexene copolymer starting material was about 87% according to $^1$H NMR spectroscopy. Elemental analyses for this $C_3C_6$-MA copolymer material found C, 81.79%, H, 13.02%. The oxygen content of this material is estimated to be about 5.19 wt % by difference.

Example 1T

Functionalization of Polypropylene Maleic Anhydride Copolymer with Tetraethylenepentamine A mixture of polypropylene/maleic anhydride (PP-MA) copolymer (6.00 g, from Example 1Q) and xylenes (45 ml) was stirred at room temperature under a nitrogen atmosphere and a solution of tetraethylenepentamine (1.17 g, 6.18 mmol) in xylenes (5 ml) was slowly added. The resulting mixture was heated in an oil bath at 170° C. for 72 hours under a nitrogen atmosphere and an azeotropic mixture of xylenes and water was collected in a Dean-Stark trap. The light brown mixture was cooled to room temperature and excess xylenes was removed on a rotary evaporator. The residual product was further purified by heating at 95° C. under high vacuum to afford a light brown viscous product (6.92 g). The molecular weight of this product was determined as $M_w$ 4247, $M_n$ 1302 (by GPC). Elemental analyses for this PP-MA-TEPA copolymer additive found C, 78.00%, H, 12.43%, N, 5.70%.

Example 1U

Functionalization of Polypropylene-Maleic Anhydride Copolymer with Tetraethylenepentamine A mixture of polypropylene/maleic anhydride (PP-MA) copolymer (8.00 g, from Example 1R) and xylenes (55 ml) was stirred at room temperature under a nitrogen atmosphere and a solution of tetraethylenepentamine (0.90 g, 4.75 mmol) in xylenes (5 ml) was slowly added. The resulting mixture was heated in an oil bath at 170° C. for 48 hours under a nitrogen atmosphere and an azeotropic mixture of xylenes and water was collected in a Dean-Stark trap. The light brown mixture was cooled to room temperature and excess xylenes was removed on a rotary evaporator. The residual product was further purified by heating at 95° C. under high vacuum to afford a light brown viscous product (8.66 g), whose molecular weight Mw was determined to be 8440 by GPC. Elemental analyses for this PP-MA-TEPA copolymer additive found C, 80.47%, H, 12.92%, N, 3.62%.

Example 1V

Functionalization of Propylene/1-Hexene-Maleic Anhydride Copolymer with Triethylenetetramine A mixture of vinyl-terminated propylene/1-hexene-maleic anhydride ($C_3C_6$-MA) copolymer (8.00 g, from Example 15) and xylenes (55 ml) was stirred at room temperature under a nitrogen atmosphere and a solution of triethylenetetramine (0.903 g, 6.18 mmol) in xylenes (5 ml) was slowly added. The resulting mixture was heated in an oil bath at 165° C. for 24 hours under a nitrogen atmosphere and an azeotropic mixture of xylenes and water was collected in a Dean-Stark trap. The light brown mixture was cooled to room temperature and excess xylenes was removed on a rotary evaporator. The residual product was further purified by heating at 95° C. under high vacuum to afford a light brown viscous product (8.70 g), whose molecular weight Mw was determined to be 5690 by GPC. Elemental analyses for this $C_3C_6$-MA-TEPA copolymer additive found C, 80.39%, H, 12.78%, N, 3.62%.

Example 2

Fouling Reduction Measured in the Alcor HLPS (Hot Liquid Process Simulator

Figure 2:
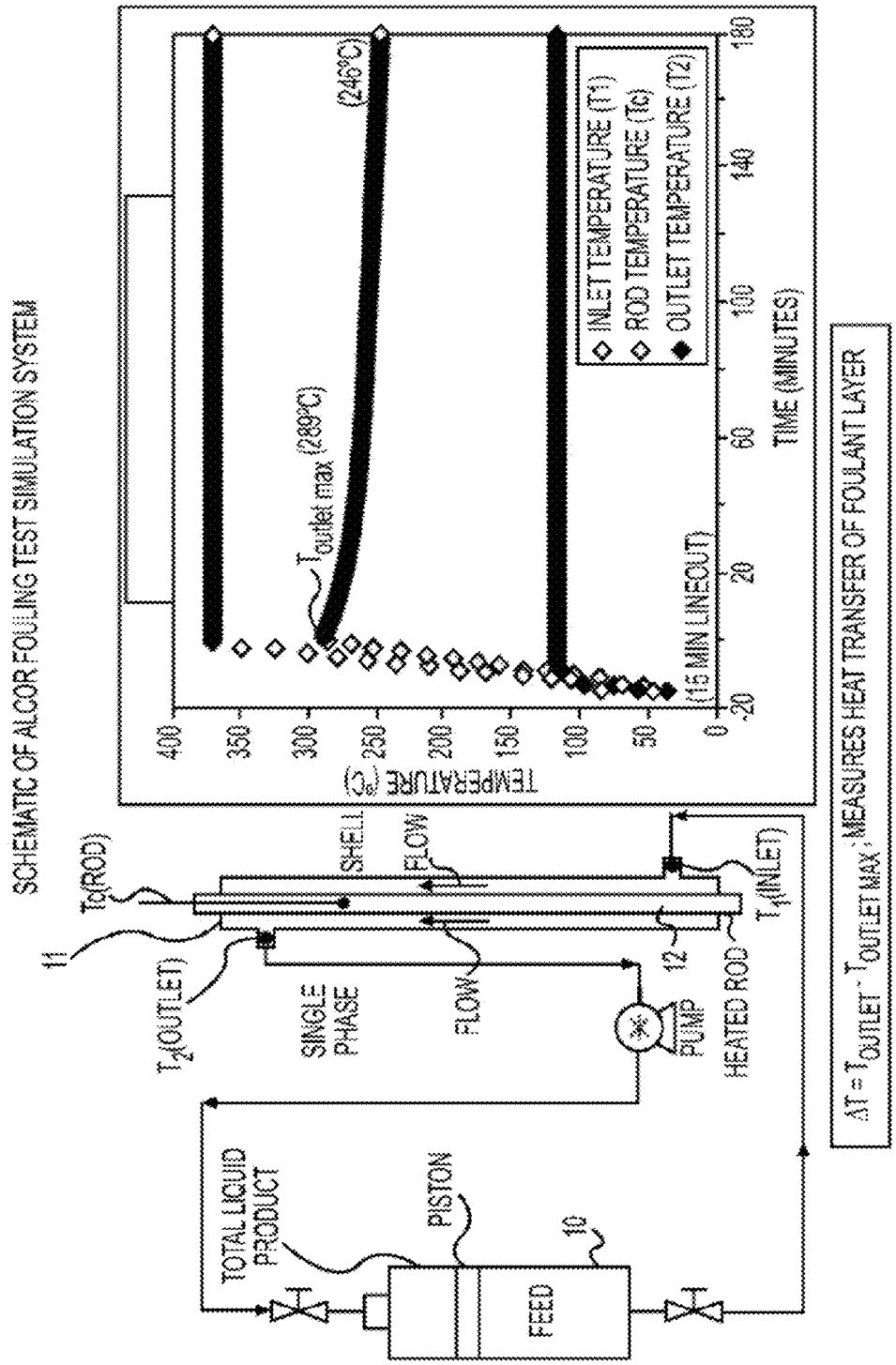
FIG. 2 is a schematic of the Alcor Hot Liquid Process Simulator (HLPS) employed in Example 3 of this application.

FIG. 2 depicts an Alcor HLPS (Hot Liquid Process Simulator) testing apparatus used to measure the impact of addition of particulates to a crude oil on fouling and the impact the addition of an additive of the disclosed subject matter has on the mitigation of fouling. The testing arrangement includes a reservoir 10 containing a feed supply of crude oil. The feed supply of crude oil can contain a base crude oil containing a whole crude or a blended crude containing two or more crude oils. The feed supply is heated to a temperature of approximately 150° C./302° F. and then fed into a shell 11 containing a vertically oriented heated rod 12. The heated rod 12 is formed from carbon-steel (1018). The heated rod 12 simulates a tube in a heat exchanger. The heated rod 12 is electrically heated to a surface temperature of 370° C./698° F. or 400° C./752° F. and maintained at such temperature during the trial. The feed supply is pumped across the heated rod 12 at a flow rate of approximately 3.0 mL/minute. The spent feed supply is collected in the top section of the reservoir 10. The spent feed supply is separated from the untreated feed supply oil by a sealed piston, thereby allowing for once-through operation. The system is pressurized with nitrogen (400-500 psig) to ensure gases remain dissolved in the oil during the test. Thermocouple readings are recorded for the bulk fluid inlet and outlet temperatures and for surface of the rod 12.

During the constant surface temperature testing, foulant deposits and builds up on the heated surface. The foulant deposits are thermally degraded to coke. The coke deposits cause an insulating effect that reduces the efficiency and/or ability of the surface to heat the oil passing over it. The resulting reduction in outlet bulk fluid temperature continues over time as fouling continues. This reduction in temperature is referred to as the outlet liquid ΔT or ΔT and can be dependent on the type of crude oil/blend, testing conditions and/or other effects, such as the presence of salts, sediment or other fouling promoting materials. A standard Alcor fouling test is carried out for 180 minutes. The total fouling, as measured by the total reduction in outlet liquid temperature over time, is plotted on the y-axis of FIGS. 5-11 and is the observed outlet temperature ($T_{outlet}$) minus the maximum observed outlet $T_{outlet\ max}$ (presumably achieved in the absence of any fouling).

Example 2A

Antifouling Additive 1 ("AFA1"), a commercially available preparation of polyisobutylene-succinic anhydride-polyamine (PIB-SA-PAM) was added to crude oil to a concentration of 374 ppm. 11 cc of water was then added to said mixture and blended for 10 seconds at 50% power using a Waring blender to generate a water-in-oil emulsion. 200 cc of said emulsion was placed into two separate transparent EDPT vessels and a voltage of 3500 volts was applied to the emulsion at an interval of 2 minutes for a duration of 16 minutes at room temperature. 120 ml of the dehydrated crude was then added to 680 ml of the original crude oil with pre-added iron oxide and mixed well. The final concentration of iron oxide in the resulting crude oil blend is 200 wppm, and the final concentration of AFA1 is approximately 50 wppm. It was assumed that the antifouling additive localized to the crude phase and was not degraded during dehydration. This crude blend containing AFA1 and iron oxide was subsequently evaluated for antifouling as described below and as illustrated in FIG. 3.

Figure 3:
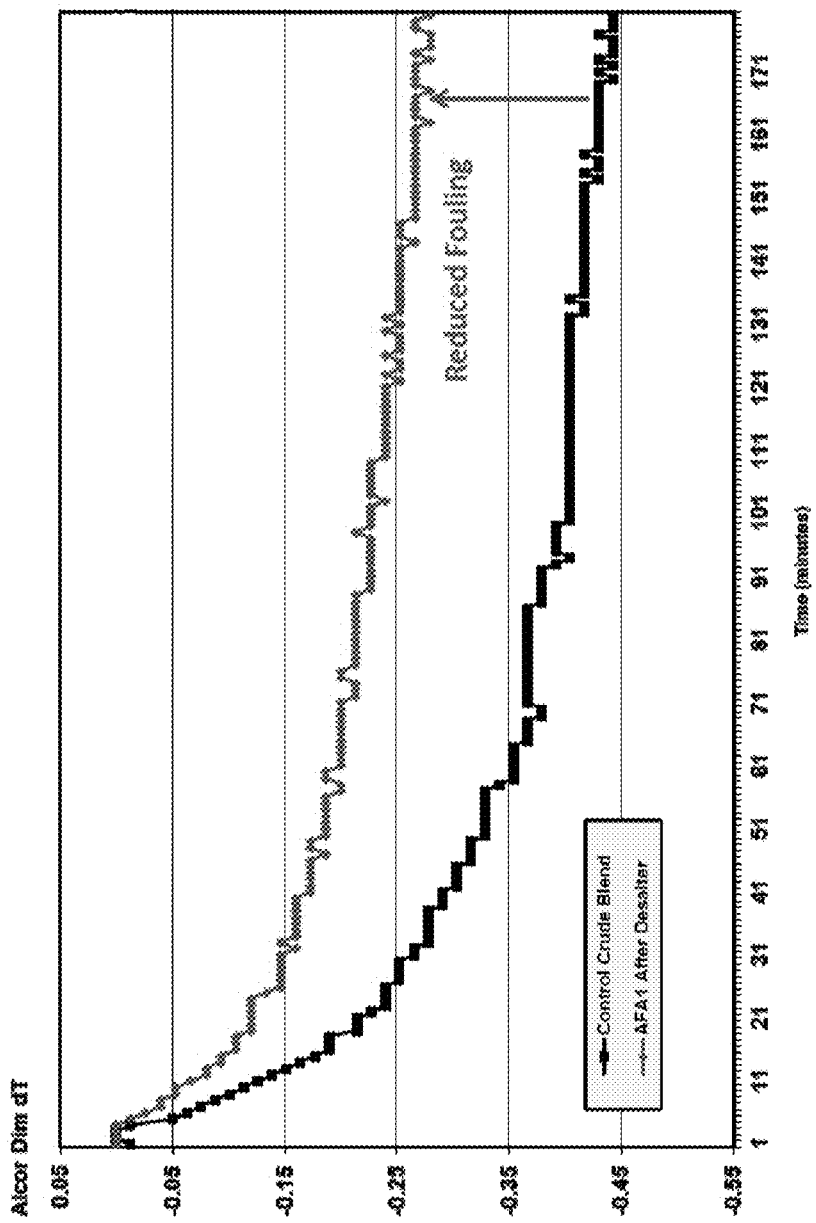
FIG. 3 is a graph demonstrating the effects of fouling of a control crude oil blend sample and a crude oil blend sample treated with 25 wppm of an additive according to the disclosed subject matter, as measured by the Alcor HLPS apparatus depicted in FIG. 2.

FIG. 3 illustrates the impact of fouling of a refinery component over 180 minutes. Two blends were tested in the Alcor unit: a crude oil control containing added rust (iron oxide) particles (200 wppm) without an additive, and the crude oil blend prepared above containing 200 wppm of iron oxide and approximately 50 wppm AFA1. As FIG. 3 demonstrates, the reduction in the outlet temperature over time (due to fouling) is less for the process blend containing the additive AFA1 as compared to the crude oil control without the additive. This indicates that the additive is effective at reducing fouling of a heat exchanger.

Example 2B

Antifouling Additive 2 ("AFA2"), polypropylene-succinic anhydride-polyamine (PP-SA-PAM) prepared according to Example 1E above, was added to crude oil to a concentration of 374 ppm. 11 cc of water was then added to said mixture and blended for 10 seconds at 50% power using a Waring blender to generate a water-in-oil emulsion. 200 cc of said emulsion was placed into two separate transparent EDPT vessels and a voltage of 3500 volts was applied to the emulsion at an interval of 2 minutes for a duration of 16 minutes at room temperature. 120 ml of the dehydrated crude was then added to 680 ml of the original crude oil with pre-added iron oxide and mixed well. The final concentration of iron oxide in the resulting crude oil blend is 200 wppm, and the final concentration of AFA2 is approximately 50 wppm. It was assumed that the antifouling additive localized to the crude phase and was not degraded during dehydration. This crude blend containing AFA2 and iron oxide was subsequently evaluated for antifouling as described below and as illustrated in FIG. 4.

Figure 4:
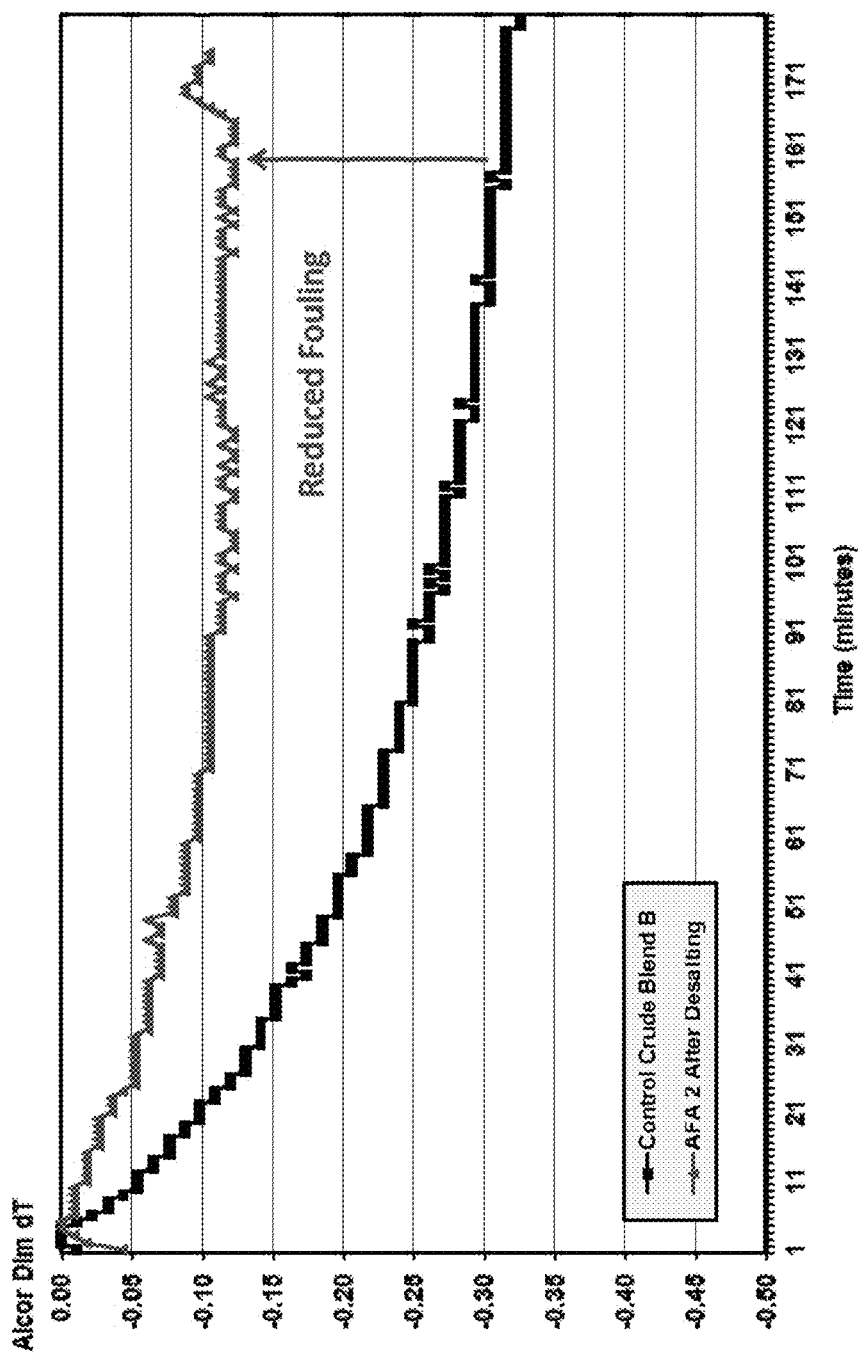
FIG. 4 is a graph demonstrating the effects of fouling of a control crude oil blend sample and a crude oil blend sample treated with 25 wppm of an additive according to the disclosed subject matter, as measured by the Alcor HLPS apparatus depicted in FIG. 2.

FIG. 4 illustrates the impact of fouling of a refinery component over 180 minutes. Two blends were tested in the Alcor unit: a crude oil control containing 200 wppm of added rust (iron oxide) particles without an additive, and the crude oil blend prepared above containing 200 wppm of iron oxide and approximately 50 wppm AFA2. As FIG. 4 demonstrates, the reduction in the outlet temperature over time (due to fouling) is less for the process blend containing the additive AFA2 as compared to the crude oil control without the additive. This indicates that the additive is effective at reducing fouling of a heat exchanger.

Example 2C

Figure 5:
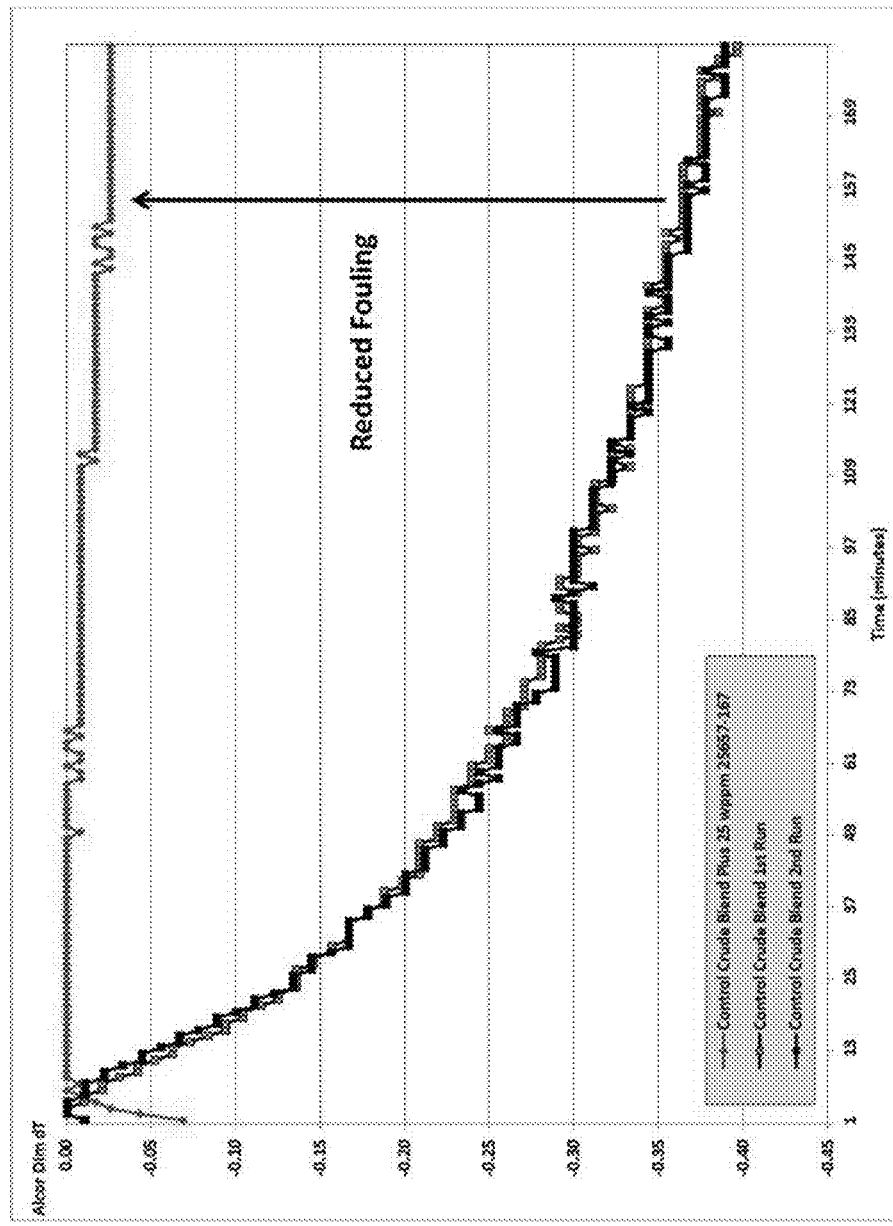
FIG. 5 is a graph demonstrating the effects of fouling of a control crude oil blend sample and a crude oil blend sample treated with 25 wppm of an additive according to the disclosed subject matter, as measured by the Alcor HLPS apparatus depicted in FIG. 2.

FIG. 5 illustrates the impact of fouling of a refinery component over 180 minutes. Two blends were tested in the Alcor unit: a crude oil control containing added rust (iron oxide) particles (200 wppm) without an additive, and the same stream with 25 wppm of the additive prepared in Example 1M. As FIG. 5 demonstrates, the reduction in the outlet temperature over time (due to fouling) is less for the process blend containing the additive as compared to the crude oil control without the additive. This indicates that the additive is effective at reducing fouling of a heat exchanger.

Example 2D

Figure 6:
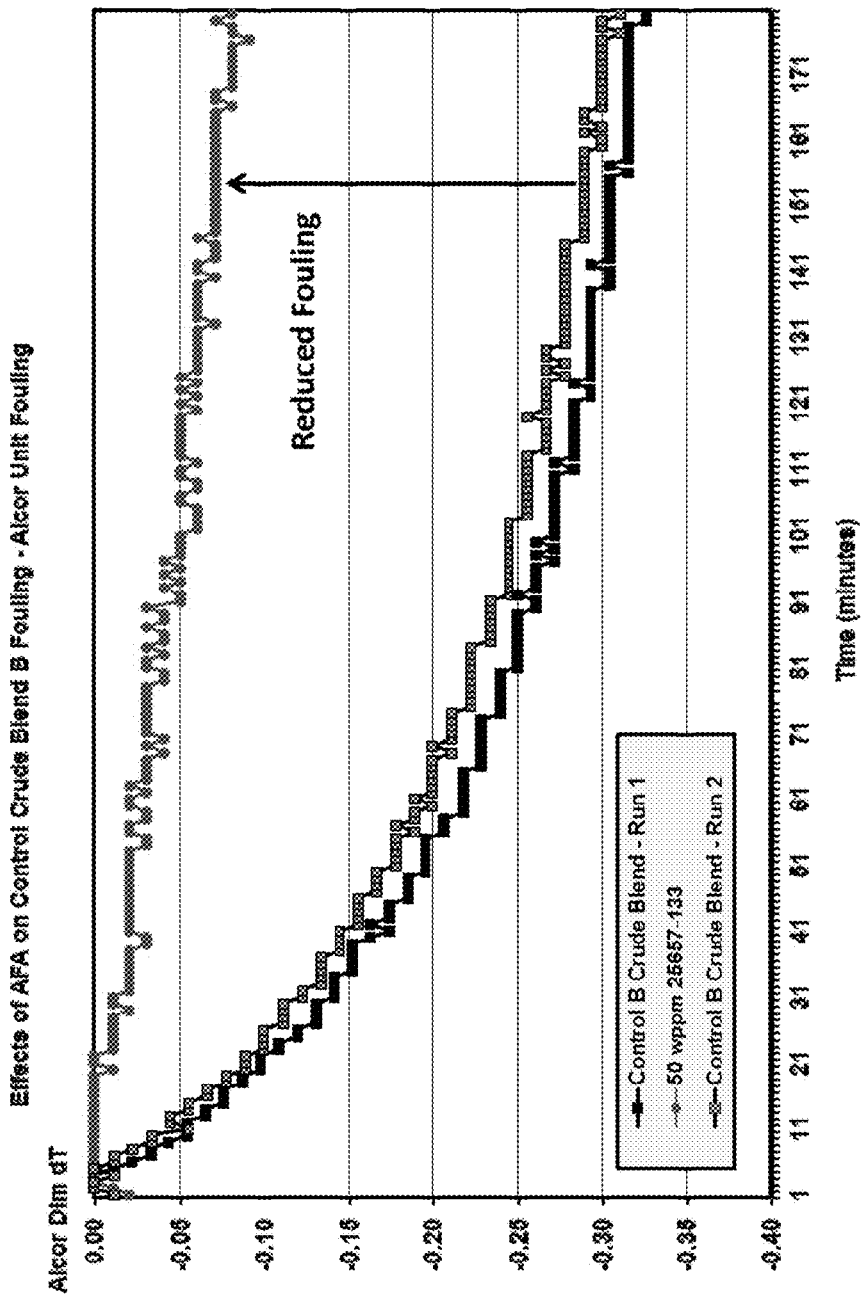
FIG. 6 is a graph demonstrating the effects of fouling of a control crude oil blend sample and a crude oil blend sample treated with 50 wppm of an additive according to the disclosed subject matter, as measured by the Alcor HLPS apparatus depicted in FIG. 2.

FIG. 6 illustrates the impact of fouling of a refinery component over 180 minutes. Two blends were tested in the Alcor unit: a crude oil control containing added rust (iron oxide) particles (200 wppm) without an additive, and the same stream with 50 wppm of the additive prepared in Example 1T. As FIG. 6 demonstrates, the reduction in the outlet temperature over time (due to fouling) is less for the process blend containing the additive as compared to the crude oil control without the additive. This indicates that the additive is effective at reducing fouling of a heat exchanger.

Example 2E

Figure 7:
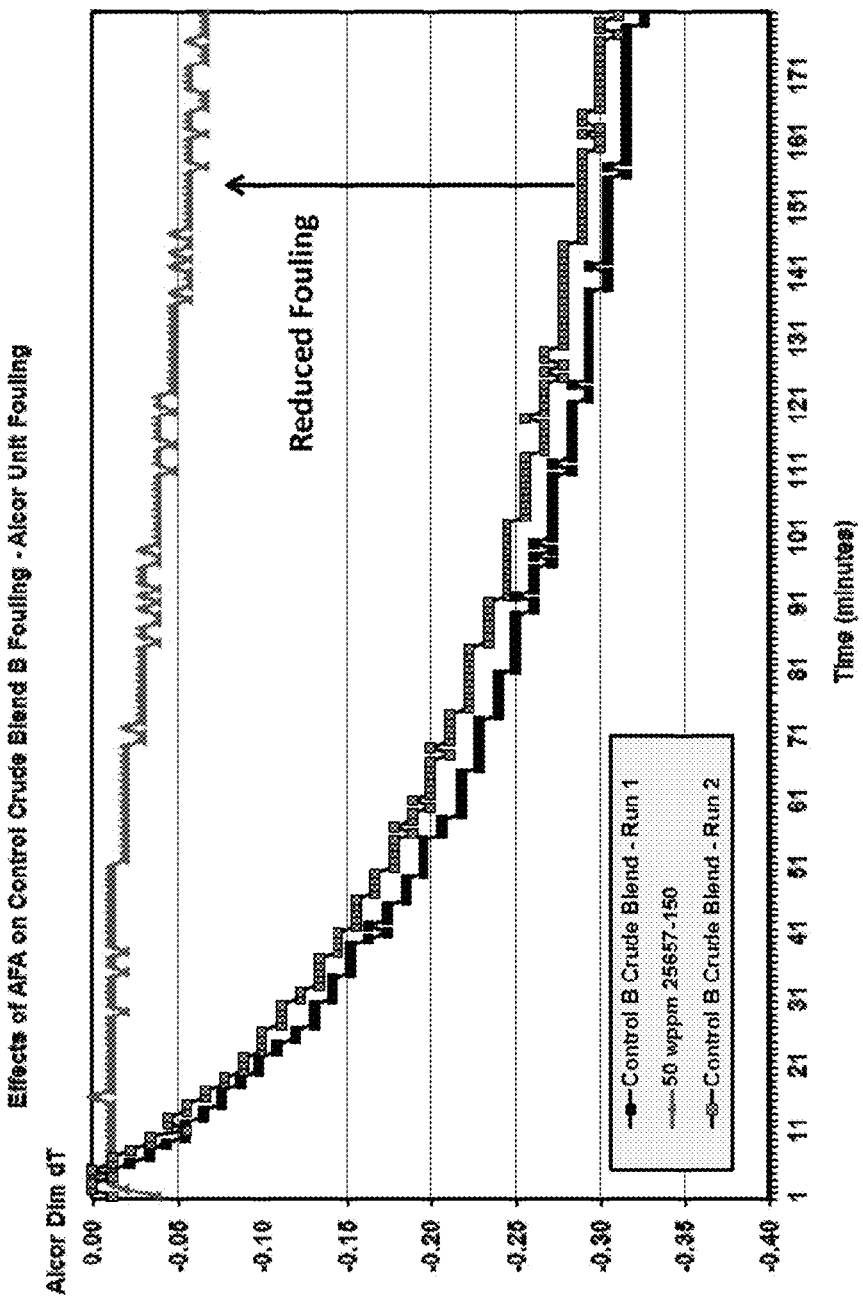
FIG. 7 is a graph demonstrating the effects of fouling of a control crude oil blend sample and a crude oil blend sample treated with 50 wppm of an additive according to the disclosed subject matter, as measured by the Alcor HLPS apparatus depicted in FIG. 2.

FIG. 7 illustrates the impact of fouling of a refinery component over 180 minutes. Two blends were tested in the Alcor unit: a crude oil control containing added rust (iron oxide) particles (200 wppm) without an additive, and the same stream with 50 wppm of the additive prepared in Example 1U. As FIG. 7 demonstrates, the reduction in the outlet temperature over time (due to fouling) is less for the process blend containing the additive as compared to the crude oil control without the additive. This indicates that the additive is effective at reducing fouling of a heat exchanger.

Example 2F

Figure 8:
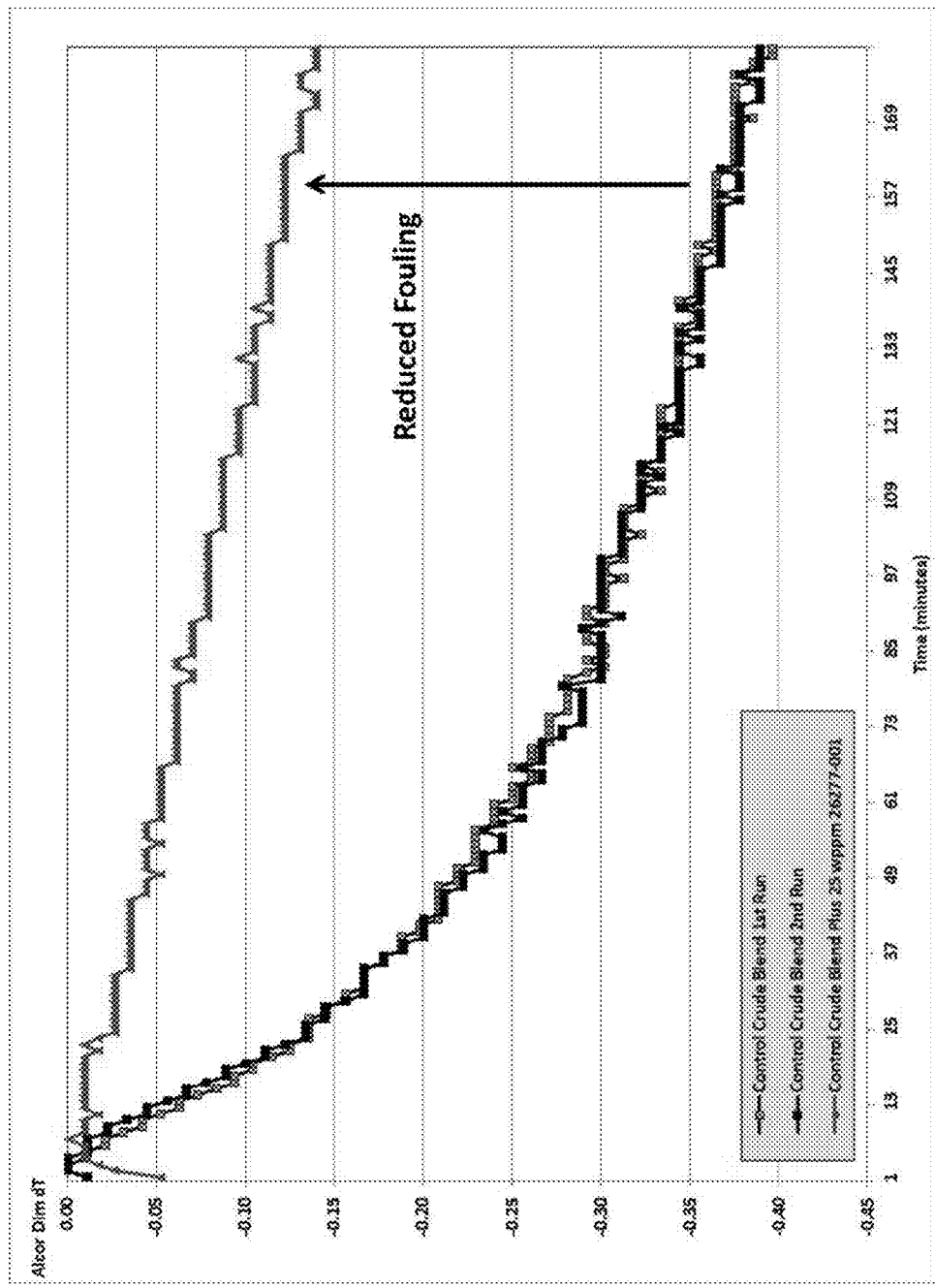
FIG. 8 is a graph demonstrating the effects of fouling of a control crude oil blend sample and a crude oil blend sample treated with 50 wppm of an additive according to the disclosed subject matter, as measured by the Alcor HLPS apparatus depicted in FIG. 2.

FIG. 8 illustrates the impact of fouling of a refinery component over 180 minutes. Two blends were tested in the Alcor unit: a crude oil control containing added rust (iron oxide) particles (200 wppm) without an additive, and the same stream with 25 wppm of the additive prepared in Example 1V. As FIG. 8 demonstrates, the reduction in the outlet temperature over time (due to fouling) is less for the process blend containing the additive as compared to the crude oil control without the additive. This indicates that the additive is effective at reducing fouling of a heat exchanger.

Example 2G

Figure 9:
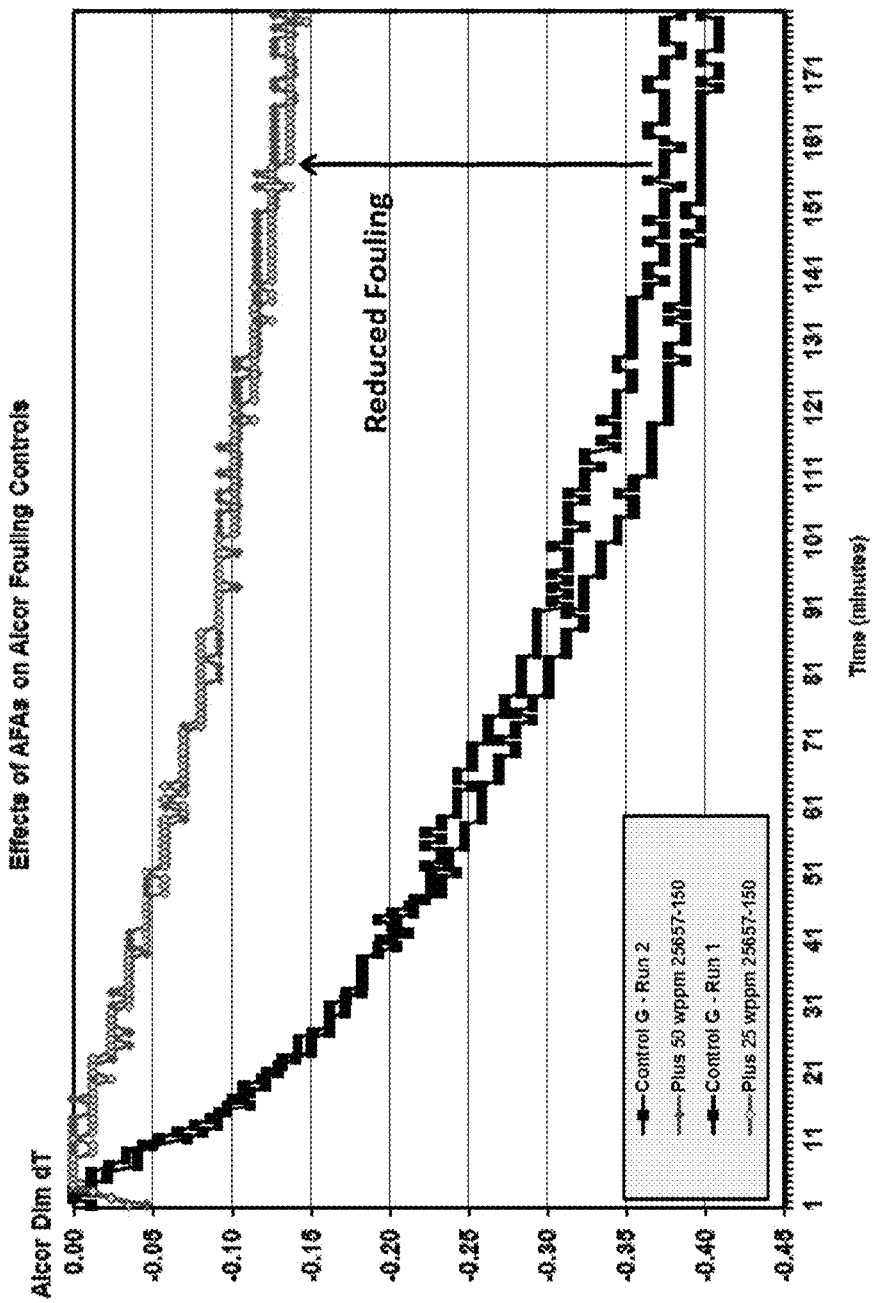
FIG. 9 is a graph demonstrating the effects of fouling of a control crude oil blend sample and a crude oil blend sample treated with 50 wppm of an additive according to the disclosed subject matter, as measured by the Alcor HLPS apparatus depicted in FIG. 2.

FIG. 9 illustrates the impact of fouling of a refinery component over 180 minutes. Two blends were tested in the Alcor unit: a crude oil control containing added rust (iron oxide) particles (200 wppm) without an additive, and the same stream with 25 ppm and 50 wppm of the additive prepared in Example 1U. As FIG. 9 demonstrates, the reduction in the outlet temperature over time (due to fouling) is less for the process blend containing the additive as compared to the crude oil control without the additive. This indicates that the additive is effective at reducing fouling of a heat exchanger.

The disclosed subject matter is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

It is further to be understood that all values are approximate, and are provided for description.

Patents, patent applications, publications, product descriptions, and protocols are cited throughout this application, the disclosures of each of which is incorporated herein by reference in its entirety for all purposes.

What is claimed is:

1. A method of predicting a need for introducing antifouling additives to a hydrocarbon stream in a hydrocarbon refinery, the method comprising:
    sampling the hydrocarbon stream to characterize whether the hydrocarbon stream is a non-HSDP crude;
    performing at least one of:
    (a) determining whether the hydrocarbon stream is subject to filterable solids levels greater than about 100 wppm; or
    (b) sampling the hydrocarbon stream to classify whether the hydrocarbon stream has an expected flow velocity lower than about 3 ft/s during normal operating conditions within a heat exchanger of the refinery; and
    indicating, using a processor, that anti-fouling additives are recommended if the hydrocarbon stream is characterized to be a non-HSDP crude and either the hydrocarbon stream is determined to be subject to filterable solids levels greater than about 100 wppm or the hydrocarbon stream is classified as having expected flow lower than about 3 ft/s within a heat exchanger of the refinery;
    introducing one or more antifouling additives to the hydrocarbon stream if the processor indicates that anti-fouling additives are recommended; wherein at least one of the one or more anti-fouling additives is a polyalkyl succinic anhydride derivative.

2. The method of claim 1, wherein characterizing whether the hydrocarbon stream is a non-HSDP crude includes determining whether the hydrocarbon stream has a solubility blending number below 90 and a total acid number below 0.3.

3. The method of claim 1, wherein determining whether the hydrocarbon stream is subject to filterable solids levels greater than about 100 wppm includes identifying whether a desalter is provided upstream of the heat exchanger to reduce filterable solids levels to less than about 100 wppm.

4. The method of claim 1, wherein at least one anti-fouling additive is provided at a concentration of about 1 wppm to about 1000 wppm of crude oil.

5. The method of claim 1, wherein the at least one anti-fouling additive is provided at a concentration of about 10 wppm to about 100 wppm of crude oil.

6. The method of claim 1, wherein the at least one anti-fouling additive is provided at a concentration of about 18 wppm to about 50 wppm of crude oil.

7. A method of predicting a need for introducing anti-fouling additives to a hydrocarbon stream in a hydrocarbon refinery, the method comprising:
  sampling the hydrocarbon stream to characterize whether the hydrocarbon stream is a non-HSDP crude;
  determining whether the hydrocarbon stream is subject to filterable solids levels greater than about 100 wppm;
  sampling the hydrocarbon stream to classify the hydrocarbon stream as having an expected flow lower than about 3 ft/s within a heat exchanger of the refinery;
  indicating, using a processor, that anti-fouling additives are recommended if the hydrocarbon stream is characterized to be a non-HSDP crude and either the hydrocarbon stream is determined to be subject to filterable solids levels greater than about 100 wppm or the hydrocarbon stream is classified as having expected flow lower than about 3 ft/s within a heat exchanger of the refinery.

8. The method of claim 7, wherein characterizing whether the hydrocarbon stream is a non-HSDP crude includes determining whether the hydrocarbon stream has a solubility blending number below 90 and a total acid number below 0.3.

9. The method of claim 7, wherein determining whether the hydrocarbon stream is subject to filterable solids levels greater than about 100 wppm includes identifying whether a desalter is provided upstream of the heat exchanger to reduce filterable solids levels to less than about 100 wppm.

10. The method of claim 7, further comprising introducing one or more antifouling additives to the hydrocarbon stream if the processor indicates that anti-fouling additives are recommended; wherein at least one of the one or more anti-fouling additives is a polyalkyl succinic anhydride derivative.

11. The method of claim 10, wherein at least one anti-fouling additive is provided at a concentration of about 1 wppm to about 1000 wppm of crude oil.

12. The method of claim 10, wherein the at least one anti-fouling additive is provided at a concentration of about 10 wppm to about 100 wppm of crude oil.

13. The method of claim 10, wherein the at least one anti-fouling additive is provided at a concentration of about 18 wppm to about 50 wppm of crude oil.

* * * * *